United States Patent
Bakulin et al.

(10) Patent No.: US 10,436,024 B2
(45) Date of Patent: Oct. 8, 2019

(54) DETECTING SUB-TERRANEAN STRUCTURES

(71) Applicant: Saudi Arabian Oil Company, Dhahran (SA)

(72) Inventors: Andrey Bakulin, Dhahran (SA); Pavel Golikov, Dhahran (SA); Ilya Silvestrov, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/994,541

(22) Filed: May 31, 2018

(65) Prior Publication Data

US 2018/0347347 A1 Dec. 6, 2018

Related U.S. Application Data

(60) Provisional application No. 62/513,822, filed on Jun. 1, 2017.

(51) Int. Cl.
*E21B 47/14* (2006.01)
*G01V 1/42* (2006.01)
(Continued)

(52) U.S. Cl.
CPC .............. *E21B 47/14* (2013.01); *G01V 1/003* (2013.01); *G01V 1/42* (2013.01); *G01V 1/46* (2013.01);
(Continued)

(58) Field of Classification Search
CPC ...................................................... E21B 47/14
(Continued)

(56) References Cited

U.S. PATENT DOCUMENTS 4,706,224 A  11/1987 Alford
4,970,697 A  11/1990 Earley et al.
(Continued)

FOREIGN PATENT DOCUMENTS

WO  2016118393  7/2016
WO  2017035104  3/2017

OTHER PUBLICATIONS

PCT Communication (Invitation to Pay Additional Fees and, Where Applicable, Protest Fee) issued in International Application No. PCT/US2018/035114 dated Sep. 6, 2018, 13 pages.
(Continued)

*Primary Examiner* — Qutbuddin Ghulamali
(74) *Attorney, Agent, or Firm* — Fish & Richardson P.C.

(57) ABSTRACT

A geologic survey system includes a plurality of acoustic sources spaced at intervals over a target area of a terranean surface. Each of the plurality of acoustic sensors is configured to generate a seismic energy wave. The system also includes a plurality of acoustic sensors positioned in a plurality of boreholes formed in a geologic formation, where the boreholes have a depth sufficient to reach a geologic datum. The system also includes a control system communicably coupled to the plurality of acoustic sensors and configured to perform operations including receiving, from the plurality of acoustic sensors, data associated with reflected acoustic signals generated by the plurality of acoustic sources and received by the plurality of acoustic sensors; determining, based on the received data, a subsurface topology of the geologic formation; and generating a subsurface model of the geologic formation based on the determined subsurface topology.

22 Claims, 20 Drawing Sheets

(51) Int. Cl.
*G01V 1/00* (2006.01)
*G01V 1/46* (2006.01)
*E21B 47/09* (2012.01)
*G01V 1/28* (2006.01)
*G01V 1/30* (2006.01)

(52) U.S. Cl.
CPC ............ *E21B 47/091* (2013.01); *G01V 1/284* (2013.01); *G01V 1/301* (2013.01)

(58) Field of Classification Search
USPC .......................................................... 367/81
See application file for complete search history.

(56) References Cited

U.S. PATENT DOCUMENTS

| | | | |
|---|---|---|---|
| 5,544,126 A | 8/1996 | Berryhill | |
| 5,930,730 A * | 7/1999 | Marfurt | G01V 1/301 702/16 |
| 6,065,538 A * | 5/2000 | Reimers | E21B 23/03 166/250.01 |
| 6,088,299 A | 7/2000 | Erath et al. | |
| 6,374,185 B1 | 4/2002 | Taner et al. | |
| 6,493,634 B1 | 12/2002 | Krebs et al. | |
| 6,728,165 B1 * | 4/2004 | Roscigno | G01H 9/004 181/102 |
| 7,746,726 B2 * | 6/2010 | Fuller | G01V 1/28 367/50 |
| 8,082,107 B2 | 12/2011 | Higginbotham et al. | |
| 2012/0092960 A1 | 4/2012 | Gaston et al. | |
| 2013/0265851 A1 * | 10/2013 | Faber | G01V 1/42 367/25 |
| 2014/0036628 A1 * | 2/2014 | Hill | G01V 1/42 367/35 |
| 2016/0291177 A1 | 10/2016 | Albertin et al. | |
| 2018/0031723 A1 | 2/2018 | Przebindowska et al. | |
| 2018/0347347 A1 * | 12/2018 | Bakulin | G01V 1/42 |

OTHER PUBLICATIONS

Al-Ali and Verschuur, "An integrated method for resolving the seismic complex near surface problem," Section I—Madrid Workshop on Near-Surface 2005, Geophysical Prospecting, vol. 54, No. 6, Nov. 2, 2006, 12 pages.

Asakawa et al., "Development of vertical cable seismic system," P008, presented at the 74th Conference and Exhibition, SPE EUROPEC, Jun. 4-7, 2012, 5 pages.

Bakulin and Jervis, "Permanent seismic installation with buried receivers for seismic monitoring of CO2 injection in desert environment: Lessons learned," presented at SEG/SPE Joint Workshop, Reservoir engineering and geophysical monitoring technology of EOR applications, May 7-15, 2017, 1 page.

Bakulin et al., "Bring geophysics closer to the reservoir—a new paradigm in reservoir characterization and monitoring," presented at the 85th Annual International Meeting, SEG, Expanded Abstracts, Oct. 18-23, 2015, 5 pages.

Bakulin et al., "Evaluating permanent seismic monitoring with shallow buried sensors in a desert environment," 82nd Annual International Meeting, Expanded Abstracts, Nov. 4-9, 2012, 5 pages.

Bakulin et al., "Making seismic monitoring work in a desert environment with complex near surface," 83rd Annual International Meeting, SEG Expanded Abstracts, Sep. 22-27, 2013, 5 pages.

Bakulin et al., "Smart DAS upholes for simultaneous land near-surface characterization and subsurface imaging," Special Section: Fiber-optic distributed sensing, The Leading Edge, Dec. 2017, 8 pages.

Bridle et al., "Near-surface models in Saudi Arabia," Geophysical Prospecting, vol. 55, Issue 6, Nov. 2007, 14 pages.

Cox, "Chapter 4—Uphole Surveys," Static corrections for seismic reflection surveys, Society of Exploration Geophysics, Jan. 1, 1999, 38 pages.

Gulati et al., "Vertical hydrophone cable acquisition and imaging on land," Geophysics vol. 66, No. 4, Jul.-Aug. 2001, 5 pages.

Ikelle and Wilson, "Potential impacts of vertical cable (VC)," Acquisition Processing, The Leading Edge, Oct. 1999, 3 pages.

Ley et al., "Development of near surface models in Saudi Arabia for low relief structures and complex near surface geology," SEG Technical Program Expanded Abstracts, SEG Annual Meeting, Oct. 26-31, 2003, 4 pages.

Mateeva et al., "Distributed acoustic sensing for reservoir monitoring with VSP," Special Section: 3D VSP, The Leading Edge, Oct. 2013, 5 pages.

Miller et al., "Vertical seismic profiling using a fibre-optic cable as a distributed acoustic sensor," Y004, presented at the 74th Conference and Exhibition, SPE EUROPEC, Jun. 4-7, 2012, 5 pages.

Nosjean et al., "Statics: from imaging to interpretation pitfalls and an efficient way to overcome them," First Break, vol. 35, No. 1, Jan. 2017, 8 pages.

Oristaglio, "Seam update: The ARID model—seismic exploration in desert terrains," The Leading Edge, vol. 34, No. 4, Apr. 2015, 2 pages.

Schuster, "Seismic interferometry," Cambridge University Press, Jan. 2, 2009, 279 pages.

Silverstrov et al., "Waveform inversion of surface waves in f-k domain in locally 1D formulations," 85th Annual International Meeting, SEG, Expanded Abstracts, Oct. 18-23, 2015, 6 pages.

International Search Report and Written Opinion issued in International Application No. PCT/US2018/035114 dated Nov. 29, 2018, 19 pages.

* cited by examiner

DETECTING SUB-TERRANEAN STRUCTURES

CROSS-REFERENCE TO RELATED APPLICATION

This application claims priority under 35 U.S.C. § 119 to U.S. Provisional Patent Application Ser. No. 62/513,822, filed on Jun. 1, 2017, and entitled "Detecting Sub-Terranean Structures," the entire contents of which are incorporated by reference herein.

TECHNICAL FIELD

This specification relates to detecting sub-terranean structures and, more particularly, detecting low-relief sub-terranean structures through seismic data acquisition and processing.

BACKGROUND

Seismic data acquired in certain environments may be significantly corrupted by near-surface complexities such as rough topography, dunes, dry river beds, and karsts. Such complexities may be conventionally taken into account through time imaging by inducing vertical travel time variations and to shift the recorded seismic traces to a reference level. The applied time shifts are constant for each trace and are known as static corrections. The complex near-surface part might also be handled more accurately by depth imaging using near-surface depth velocity model. The models, which are used either for calculation of static corrections or for depth imaging can be estimated with refraction tomography or other similar techniques from surface seismic data. However, these methods usually are unable to handle all near surface complexities typical for certain environments, particularly inversion of seismic wave velocities with depth.

SUMMARY

In a general implementation according to the present disclosure, a geologic survey system includes a plurality of acoustic sources spaced at intervals over a target area of a terranean surface. Each of the plurality of acoustic sensors is configured to generate a seismic energy wave. The system also includes a plurality of acoustic sensors positioned in a plurality of boreholes formed in a geologic formation, where the boreholes have a depth sufficient to reach a geologic datum. The system also includes a control system communicably coupled to the plurality of acoustic sensors and configured to perform operations including receiving, from the plurality of acoustic sensors, data associated with reflected acoustic signals generated by the plurality of acoustic sources and received by the plurality of acoustic sensors; determining, based on the received data, a subsurface topology of the geologic formation; and generating a subsurface model of the geologic formation based on the determined subsurface topology.

In an aspect combinable with the general implementation, the plurality of boreholes are formed at a regular interval corresponding to a desired sample wavelength of the seismic energy wave.

In another aspect combinable with any of the previous aspects, each acoustic sensor includes a fiber optic acoustic sensor.

In another aspect combinable with any of the previous aspects, each fiber optic acoustic sensor is a fiber optic turnaround assembly.

In another aspect combinable with any of the previous aspects, the plurality of fiber optic turnaround assemblies are coupled together with a single fiber optic cable.

In another aspect combinable with any of the previous aspects, the operation of determining the subsurface topology includes processing, with the control system, the data associated with reflected acoustic signals in a time imaging model; and processing, with the control system, the data associated with reflected acoustic signals in a depth imaging model.

Another aspect combinable with any of the previous aspects further includes estimating static corrections of the data associated with reflected acoustic signals.

Another aspect combinable with any of the previous aspects further includes partitioning the estimated static corrections into a short wavelength and a long wavelength.

Another aspect combinable with any of the previous aspects further includes attenuating noise from the estimated static corrections of the data associated with reflected acoustic signals.

Another aspect combinable with any of the previous aspects further includes shifting the estimated static corrections of the data associated with reflected acoustic signals to a plurality of pre-defined intermediate depth levels based on vertical timeshifts measured from the plurality of boreholes.

Another aspect combinable with any of the previous aspects further includes stacking common gathers from each of the plurality of acoustic sensors to generate a plurality of supergathers, each of the supergathers having an improved signal-to-noise ratio.

Another aspect combinable with any of the previous aspects further includes, at each of the plurality of pre-defined intermediate depth levels sorting the supergathers to a common depth point, applying the short-wavelength static corrections, and estimating normal moveout velocity and applying a normal moveout correction and stack.

Another aspect combinable with any of the previous aspects further includes applying the long-wavelength static shifts to the geologic datum.

Another aspect combinable with any of the previous aspects further includes stacking the plurality of stacks generated from the plurality of pre-defined intermediate depth levels into a final stack.

Another aspect combinable with any of the previous aspects further includes performing a post-stack time migration.

Another aspect combinable with any of the previous aspects further includes performing an up-down separation of the noise attenuated estimated static corrections of the data associated with reflected acoustic signals.

Another aspect combinable with any of the previous aspects further includes generating a near-surface velocity model between the terranean surface and the geologic datum by interpolating measured velocities of the reflected acoustic signals.

Another aspect combinable with any of the previous aspects further includes generating a deep velocity model at a depth below the geologic datum.

Another aspect combinable with any of the previous aspects further includes pre-stacking depth migration from the terranean surface based on a global velocity model that includes the near-surface velocity model.

In another aspect combinable with any of the previous aspects, the plurality of acoustic sources are spaced at regular and repeating intervals over the target area of a terranean surface, the plurality of acoustic sources including a source carpet positioned on the terranean surface.

In another aspect combinable with any of the previous aspects, the regular and repeating intervals are between 100 meters and 1000 meters.

In another aspect combinable with any of the previous aspects, the geologic formation includes a complex geologic structure and a low-relief geologic structure.

In another general implementation, a method includes positioning a plurality of acoustic sensors into a plurality of boreholes; positioning a plurality of acoustic sources on or near a terranean surface; emitting, by the plurality of acoustic sources, an acoustic signal directed into a subsurface geologic formation; receiving, by the plurality of acoustic sensors, a reflected acoustic signal from the subsurface geologic formation; determining a subsurface topology of the geologic formation based on receiving the reflected acoustic signal by the plurality of acoustic sensors; and creating a subsurface model of the geologic formation based on the determined topology.

Another aspect combinable with the general implementation further includes drilling the plurality of boreholes in a geologic formation, at least a portion of the boreholes having a depth sufficient to reach a geologic datum.

Another aspect combinable with any of the previous aspects further includes processing, with a control system communicably coupled to the acoustic sensors, the reflected acoustic signal in a time imaging model.

Another aspect combinable with any of the previous aspects further includes processing, with the control system, the reflected acoustic signal in a depth imaging model.

Another aspect combinable with any of the previous aspects further includes estimating static corrections of the reflected acoustic signal.

Another aspect combinable with any of the previous aspects further includes partitioning the estimated static corrections into a short wavelength and a long wavelength.

Another aspect combinable with any of the previous aspects further includes attenuating noise from the estimated static corrections of the reflected acoustic signal.

Another aspect combinable with any of the previous aspects further includes shifting the estimated static corrections of the reflected acoustic signal to a plurality of pre-defined intermediate depth levels based on vertical time-shifts measured from the plurality of boreholes.

Another aspect combinable with any of the previous aspects further includes stacking common gathers from each of the plurality of acoustic sensors to generate a plurality of supergathers, each of the supergathers having an improved signal-to-noise ratio.

Another aspect combinable with any of the previous aspects further includes, at each of the plurality of pre-defined intermediate depth levels, sorting the supergathers to a common depth point, applying the short-wavelength static corrections, and estimating normal moveout velocity and applying a normal moveout correction and stack.

Another aspect combinable with any of the previous aspects further includes applying the long-wavelength static shifts to the geologic datum.

Another aspect combinable with any of the previous aspects further includes stacking the plurality of stacks generated from the plurality of pre-defined intermediate depth levels into a final stack.

Another aspect combinable with any of the previous aspects further includes performing a post-stack time migration.

Another aspect combinable with any of the previous aspects further includes performing an up-down separation of the noise attenuated estimated static corrections of the reflected acoustic signal.

Another aspect combinable with any of the previous aspects further includes generating a near-surface velocity model between the terranean surface and the geologic datum by interpolating measured velocities of the reflected acoustic signals.

Another aspect combinable with any of the previous aspects further includes generating a deep velocity model at a depth below the geologic datum.

Another aspect combinable with any of the previous aspects further includes pre-stacking depth migration from the terranean surface based on a global velocity model that includes the near-surface velocity model.

In an aspect combinable with any of the previous aspects, positioning the plurality of acoustic sources on or near the terranean surface includes positioning the plurality of acoustic sources at regular and repeating intervals over a target area of the terranean surface, the plurality of acoustic sources including a source carpet positioned on the terranean surface.

In an aspect combinable with any of the previous aspects, the regular and repeating intervals are between 100 meters and 1000 meters.

In another general implementation, a computer-implemented method for generating a subsurface model includes identifying, with a hardware processor, data associated with reflected acoustic signals generated by the plurality of acoustic sources and received by the plurality of acoustic sensors; determining, with the hardware processor, a subsurface topology of the geologic formation based on the identified data; and generating, with the hardware processors, a subsurface model of the geologic formation based on the determined subsurface topology.

In an aspect combinable with the general implementation, determining the subsurface topology includes: processing, with the hardware processor, the data associated with reflected acoustic signals in a time imaging model; and processing, with the hardware processor, the data associated with reflected acoustic signals in a depth imaging model.

In an aspect combinable with any of the previous aspects, processing the data associated with reflected acoustic signals in the time imaging model includes: estimating static corrections of the data associated with reflected acoustic signals; partitioning the estimated static corrections into a short wavelength and a long wavelength; attenuating noise from the estimated static corrections of the data associated with reflected acoustic signals; and shifting the estimated static corrections of the data associated with reflected acoustic signals to a plurality of pre-defined intermediate depth levels based on vertical timeshifts measured from the plurality of boreholes; stacking common gathers from each of the plurality of acoustic sensors to generate a plurality of supergathers, where each of the supergathers have an improved signal-to-noise ratio.

In an aspect combinable with any of the previous aspects, processing the data associated with reflected acoustic signals in the time imaging model further includes: at each of the plurality of pre-defined intermediate depth levels: sorting the supergathers to a common depth point, applying the short-wavelength static corrections, and estimating normal moveout velocity and applying a normal moveout correction and stack; applying the long-wavelength static shifts to the geologic datum; stacking the plurality of stacks generated from the plurality of pre-defined intermediate depth levels into a final stack; and performing a post-stack time migration.

In an aspect combinable with any of the previous aspects, processing the data associated with reflected acoustic signals in the depth imaging model includes: performing an up-down separation of the noise attenuated estimated static corrections of the data associated with reflected acoustic signals; generating a near-surface velocity model between the terranean surface and the geologic datum by interpolating measured velocities of the reflected acoustic signals; generating a deep velocity model at a depth below the geologic datum; and pre-stacking depth migration from the terranean surface based on a global velocity model that includes the near-surface velocity model.

Implementations of a seismic data acquisition system according to the present disclosure may include one, some, or all of the following features. For example, implementations may facilitate a direct measurement of a near-surface velocity to properly sample long-wavelength near-surface velocity variations and interpolate this measurement to seismic grid in the focus areas of low-relief targets where reduction of the near-surface related uncertainty plays a great role.

Implementations according to the present disclosure may be realized in computer-implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

Figure 1A:
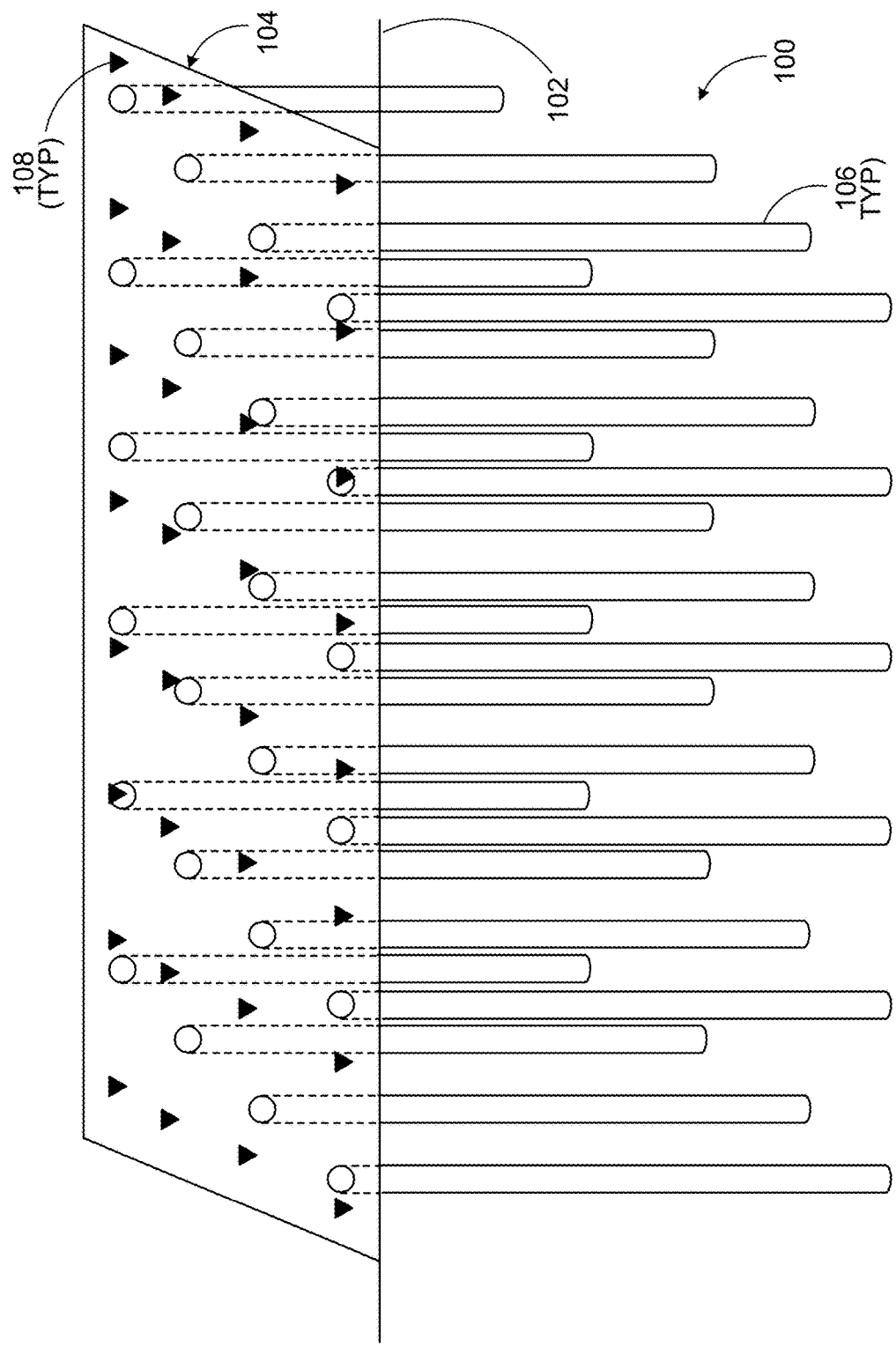
FIGS. 1A-1C are schematic illustrations of an example embodiment of a seismic data acquisition and processing system according to the present disclosure.

This present disclosure describes implementations of seismic data acquisition and processing systems, methods, and computer-readable media that detect and determine subterranean structures, for example, low-relief hydrocarbon reservoir structures. In some aspects, the seismic data acquisition and processing system includes one or more acoustic sources positioned on a terranean surface and one or more acoustic sensors positioned in boreholes formed from the surface into one or more subterranean zones. In some aspects, the acoustic sensors for or include a distributed acoustic sensing (DAS) system within the boreholes, which may be formed over an area of interest at a specified interval. In some aspects, depth of the boreholes may be sufficient (and selected) to reach a particular reference seismic datum lying at a depth below the terranean surface and at a depth below, for instance, any complex near-surface formations.

In example implementations, one or more seismic signals are induced at the terranean surface with the acoustic sources. For instance, the signals may be induced at the surface locations with sources at a relatively fine interval and is recorded simultaneously in all (or most) of the boreholes. Vertical sound travel times along the boreholes may be used to estimate a near surface velocity model, as well as static corrections to the reference datum near the boreholes. The velocities and the static corrections are interpolated between adjacent boreholes to produce a near-surface depth velocity model and a long-wavelength static model for the area of interest.

In some aspects, seismic data recorded in the boreholes is processed using processing flows to obtain subsurface images in depth and time domains. For example, a time processing flow includes, in some aspects, noise removal and attenuation of the data in a common-receiver domain (for example, a receiver that receives seismic signals from multiple sources). The time processing flow may also include binning the detected seismic data at several depth levels, as well as a velocity estimation and stack for the seismic data at each depth level. In some aspects, the time processing flow may also include a final shift and stack of all preliminary stacks.

The depth processing flow may be implemented by the seismic data acquisition and processing system subsequent to the noise attenuation and short-wavelength static correction of the detected seismic data. During the depth processing flow an up-/down-going wavefield separation occurs, with the up-going wavefield used as an input for the prestack depth migration from the smoothed topography level. A velocity model in depth may be generated as a combination of near surface model obtained from shallower portions of the boreholes (for example, the boreholes) while a deeper depth velocity model may be obtained with depth model building techniques such as tomography or other methods.

Thus, the illustrated example implementations of the seismic data acquisition and processing system may build near a near surface velocity model by interpolating borehole measurements of the seismic data generated by the acoustic sensors. The seismic data acquisition and processing system may also generate one or more images of the sub-surface with seismic data from the acoustic sensors positioned in the boreholes.

Figure 1B:
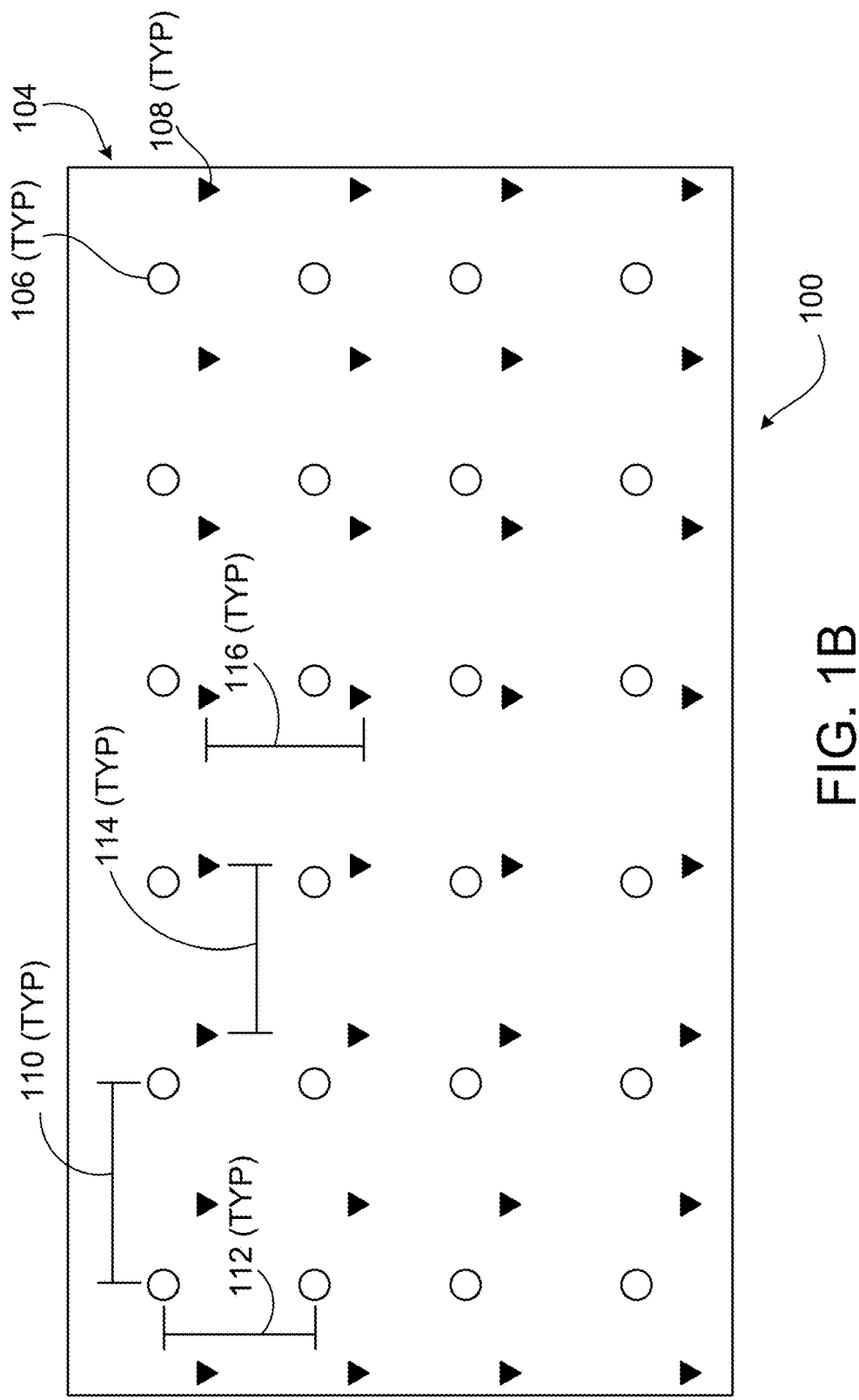
Figure 1C:
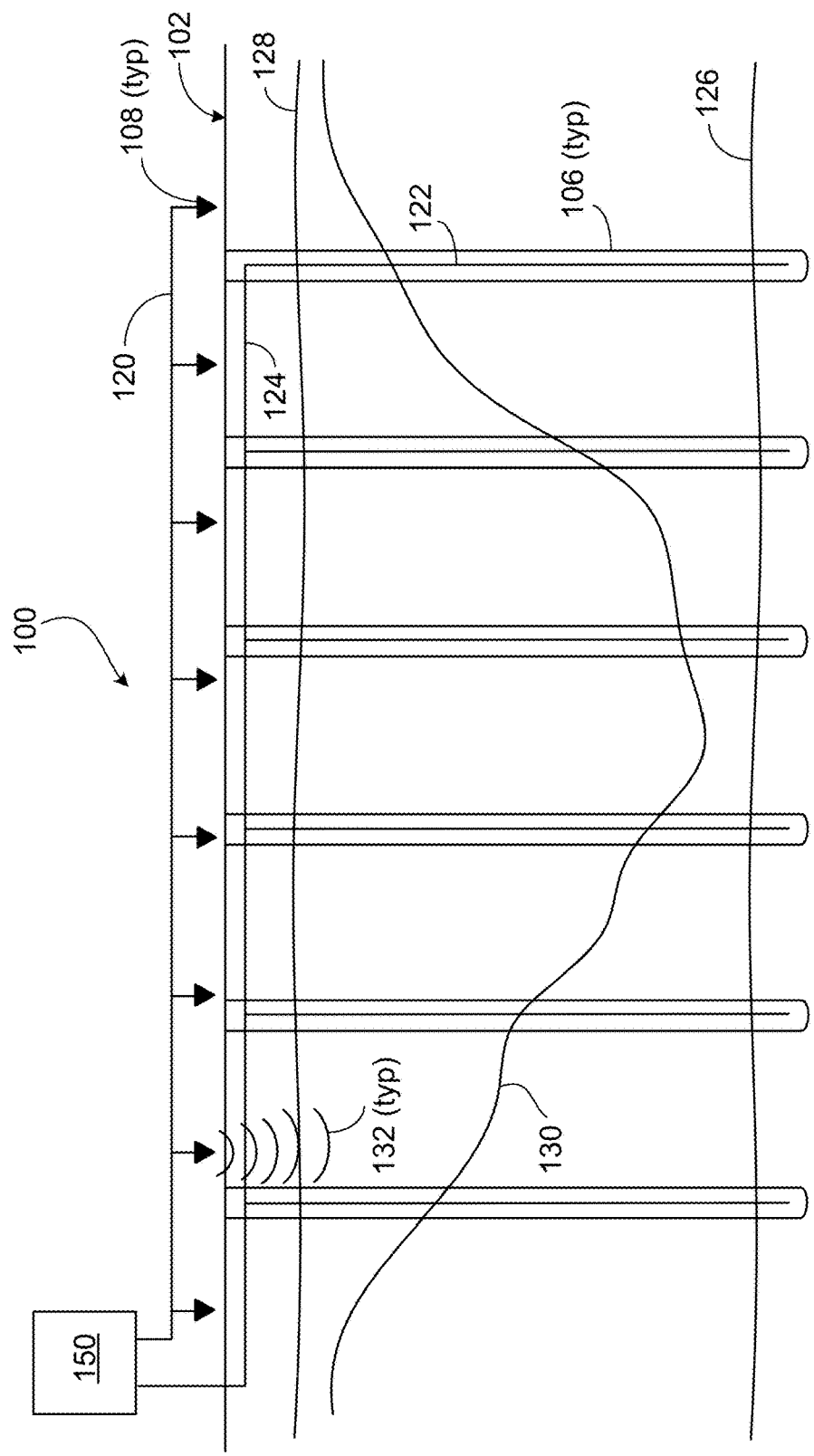

FIGS. 1A-1C are schematic illustrations of an example embodiment of a seismic data acquisition and processing system 100. FIG. 1A shows an isometric view of the system 100, while FIG. 1B shows a plan view of the system 100 and FIG. 1C shows a side, or depth, view of the system 100. As shown, the seismic data acquisition and processing system includes multiple boreholes 106 formed from a terranean surface 102 within a zone of interest (or area of interest) 104. Multiple acoustic sources 108 (for example, a seismic vibrator, hammer, air gun, plasma sound source, thumper trucks, or explosives) are positioned on the terranean surface 102 within the area of interest 104. Although each of the boreholes 106 and each of the acoustic sources 108 are shown as originating within or positioned within the area of interest 104 (on the terranean surface 102), one or more of the boreholes 106 may be formed from the terranean surface 102 outside of the area of interest 104 (or extending at a depth below the surface 102 outside of the area of interest 104). Further, one or more acoustic sources 108 may be positioned on or near the terranean surface 102 outside of the area of interest 104.

In the example system 100 shown in FIGS. 1A-1C, acoustic sensors 122 (shown in FIG. 1C) are positioned in each of the boreholes 106. In this example, each of the acoustic sensors 122 include fiber optic seismic sensing cables that sense acoustic sound through bending of the cables due to soundwaves 132 that emit from one or more of the acoustic sources 108. The fiber optic seismic sensing cables within each borehole 106 may be coupled together by a near-surface cable 124 (for example, a fiber optic cable located in a near-surface trench) and connected to a control system 150 (explained in more detail later). In alternative implementations, the acoustic sensors 122 may include one or more geophones that are positioned within the boreholes 106 and coupled together by the near-surface cable 124.

Figure 9:
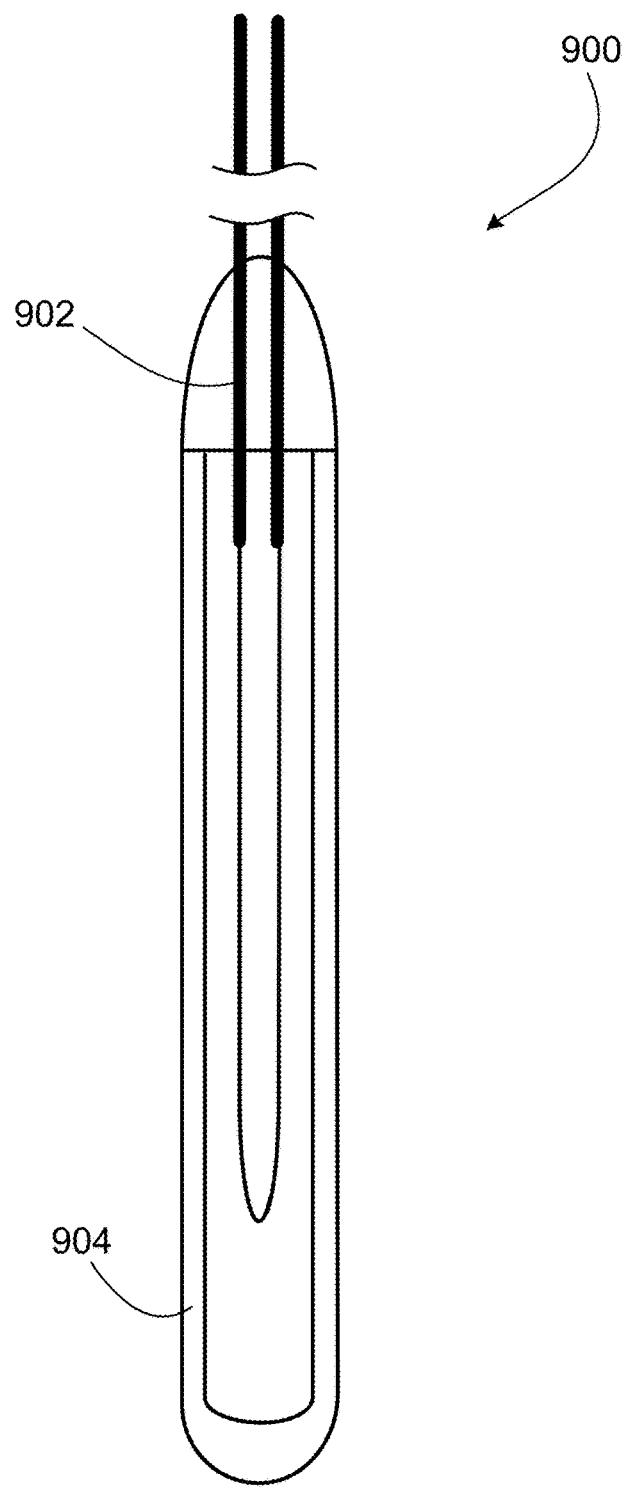
FIG. 9 is a schematic illustration of an example fiber optic turnaround assembly.

In some aspects, each acoustic sensor 122 may be a fiber optic turnaround assembly 900 as shown in FIG. 9. For example, the fiber optic turnaround assembly 900 may include a fiber optic cable 902 that extends into a cap 904 (for example, a Pyrex cap) and forms a loop in the cap 904. For example, the fiber optic turnaround assembly 900 includes the continuous fiber cable 902 that also extends through multiple, other assemblies 900. Thus, use of multiple fiber optic turnaround assemblies 900 in the system 100 may allow for simultaneous recording of seismic data (with one interrogator), thus increasing productivity and reducing cost. In some aspects, the assemblies 900 may be pre-manufactured and have relatively small diameters as well as being well protected by the cap 904, thereby solving or helping to solve a challenge of maintaining a minimal bending radius of optical fiber. This constraint often leads to large diameter boreholes being required and special turnaround assemblies that are often a weak point in the system.

Further, in a system 100 that includes the continuous fiber cable 902 installed through multiple boreholes, the horizontal fiber cable portions that link such holes are usually trenched in shallow (for example, 1 m) trenches for protection and better coupling. Thus, automatic trenching and installation with cable ploughing technology may be used to reduce cost and installation time. By recording the seismic signals in horizontal segments of fiber cable trenched at the surface, seismic data suitable for near-surface related studies can be acquired. Further, continuous fiber optic cables may allow for the output of data with relatively dense acoustic sensor spacing. With this, a well-sampled recording of ground-roll can be achieved that enables for picking of dispersion curves and other near-surface modes on velocity-frequency panels, inverting them for a local one-dimensional model, and joining such models at different locations. At the same time, reflections from shallow interfaces can be recorded that enables normal-moveout velocity analysis and imaging similar to conventional seismic. Refractions waves also can be recorded with the surface fiber optic cable to provide input to full-waveform inversion, first-arrival tomography, and other refraction-based inversion techniques.

Further, use of a continuous fiber optic cable may allow multiscale seismic surveys with a single measuring fiber using the same source excitation. In conventional acquisition systems, one has to decide on geophone sampling and number of geophones in a group ahead of time. These parameters effect the data quality, the strength of different recording events and further usability of seismic data for resolving different subsurface targets. For example, for shallow or near-surface zones, one needs to use small intervals between receivers and small size of receivers groups to record tiny peculiarities of seismic wavefield. For deeper targets, more sparse acquisition is usually used with large arrays aiming to attenuate surface-related noise and to enhance week target reflections. In DAS acquisition the sensing cable is always the same, whereas all acquisition parameters are set in the recording box (interrogator). This allows the user to produce different seismic datasets using a single recording. For example, by varying an output sampling interval and a gauge-length (G), a length of fiber cable along which the backscattering light is averaged to form the output seismic signal, the user can get such sets of seismic data as: (1) "shallow" acquisition with small G and super-dense spacing to characterize the near surface that is critical for land seismic; and (2) "deep" acquisition with large G and moderate spacing which would be a proxy for conventional data targeting deep reflections and requires good signal-to-noise ratio for weak signal.

In further aspects, the fiber cable 902 may be an omni-directional cable. For example, some fiber cables possess strong directivity, meaning they are most sensitive to signal/strains along the fiber cable and insensitive to signals/strains perpendicular to the fiber cable. Thus, there may be diminishing sensitivity between parallel and perpendicular directions. While fiber optic cables in vertical boreholes are sensitive to vertically propagating P-wave reflections, horizontal cables do not record such signals, limiting use of the surface portions of the cable to, for example, P-wave tomography or velocity analysis. To mitigate this, an omni-directional fiber optic cable that is sensitive to signal/strains in all directions (or at least increased sensitivity to signals with larger angles from parallel to the cable).

As shown in this example, the boreholes 106 and the acoustic sources 108 are formed and positioned, respectively, in a repeating grid array from or at the terranean surface 102. For example, each of the boreholes 106 is separated in a first direction from an adjacent borehole 106 by a distance 110, while each of the boreholes 106 is separated in a second direction from an adjacent borehole 106 by a distance 112. In some aspects, the distances 110 and 112 may be equal or substantially equal (for example, within 5-10 percent). In some aspects, the distances 110 and 112 may be between a few meters and 1000 meters (m). In some aspects, the distances 110 and 112 may depend upon, for example, a relative depths of the boreholes 106. For instance, for boreholes 106 within the area of interest 104 of up to 100 m, the distances 110 and 112 may be between 100 m and 300 m. For boreholes 106 within the area of interest 104 of up to 300 m, the distances 110 and 112 may be between 300 m and 600 m. For boreholes 106 within the area of interest 104 of over 300 m, the distances 110 and 112 may be up to 1000 m.

In some examples, the boreholes 106 or the acoustic sources 108, or both, may not be formed or positioned in a repeating grid array as shown in FIGS. 1A-1C. For example, the boreholes 106 may be more randomly formed from the terranean surface 102 in the area of interest 104, or may also be formed in a different (for example, non-square) repeating pattern within the area of interest 104. Further, the sources 108 may be more randomly positioned on the terranean surface 102 in the area of interest 104, or may also be positioned in a different (for example, non-square) repeating pattern within the area of interest 104. As shown in FIG. 1B, each acoustic source 108 may be separated, in a first dimension, from adjacent sources 108, by a distance 114. Further, each of the sources 108 is separated in a second direction from an adjacent source 108 by a distance 116. In some aspects, the distances 114 and 116 may be equal or substantially equal (for example, within 5-10 percent). In some aspects, the distances 114 and 116 may be between a few meters and 1000 m. In some aspects, the distances 114 and 116 may depend upon, for example, a relative depths of the boreholes 106.

In the example system 100 of FIGS. 1A-1C, the area of interest 104 includes a portion of the terranean surface 102 and includes or defines a "source carpet" within which the acoustic sources 108 are positioned. In some aspects, this source carpet covers or extends to cover an area of the terranean surface 102 from which all of the boreholes 106 are formed. In this system 100, the distribution of the acoustic sources 108 (as well as the number of the sources 108) may provide good sampling of the wavefield and high fold at a target horizon. In some aspects, there may be groups of multiple acoustic sources for an increased signal to noise ratio.

As shown in FIG. 1C, the boreholes 106 are formed such that a bottom of each borehole 106 extends at a depth below a seismic reference datum 126. The seismic reference datum 126, in this example, may be between about 50-100 m deeper than the terranean surface 102, but may be shallower or deeper in alternative implementations. Further, in some aspects, the seismic reference datum 126 may be oriented along a particular polar direction, for example, east-west. The seismic reference datum 126, for instance, defines a reference (for example, arbitrary) planar surface to which corrections are made and on which sources and receivers are assumed to lie to minimize the effects of topography and near-surface zones of low velocity. In some aspects, as shown in FIG. 1C, the seismic reference datum 126 is defined at a depth below a terranean surface. In some aspects, such as marine-based seismic data acquisition and processing system, the seismic reference datum may be at sea level. As further shown in FIG. 1C, a surface layer 128 resides under the terranean surface and is at a shallower depth than a complex near surface structure 130 that includes a low-relief structure.

In operation, system 100 may be implemented by forming the boreholes 106 (for example, by drilling) and positioning the acoustic sources 108 in a grid pattern as previously described. The acoustic sensors 122 (for example, the fiber optic acoustic sensors) are positioned in the boreholes 106. The control system 150 may operate the acoustic sources 108 (through control cable 120) to generate one or more seismic energy waves 132 from the terranean surface 102, through the surface layer 128, and into and through the complex near surface structure 130 to reach one or more of the acoustic sensors 122 at various depths within the boreholes 106. In some examples, a wavelength of the seismic energy 132 may be a long wavelength (for example, at about 2 kilometers (km)). In such examples, the boreholes may be spaced at 1 km intervals so that there are at least two boreholes 106 per spatial wavelength. This allows the sampling by the acoustic sensors 122 to properly sample a near surface model and statics to enable a reliable interpolation between boreholes 106. The minimum depth of the boreholes 106 may be chosen to be sufficient to reach the seismic reference datum 126 located at a depth below the illustrated near-surface complex structures.

During operation of the system 100, the control system 150 may record seismic signal simultaneously in all boreholes 106 at all depth levels, thus acquiring both near-surface velocities (of the seismic energy waves 132 through the subterranean zones) as well as seismic surveys with the acoustic sensors 122. The system 100 thus ensures that subsurface seismic reflectors of interest have continuous angle/offset coverage with the acoustic sensors 122 along the grid of the boreholes 106. In some cases, deeper boreholes 106 may allow for a reduction in a horizontal distance (for example, distances 110 and 112) between them, which can be preferable in the case of uncomplicated shallow drilling. In the case of complex drilling to form the boreholes 106, shallower holes may be preferred but at a finer spatial interval. Conventional acoustic sources (for example, Vibroseis technique sources) may be used to provide a reliable seismic signal 132 from the deep target horizons.

In some aspects, all are part of the control system 150 may be located near or adjacent one or more of the boreholes 106 and able to communicate (through wireless or wired communication) with another portion of the control system 150 (or another computing system) that is remotely located from the boreholes 106. The control system 150, therefore, may represent a computing system or systems that are located at the boreholes 106 or remotely from the boreholes 106 (for example, in a data processing lab).

Figure 2:
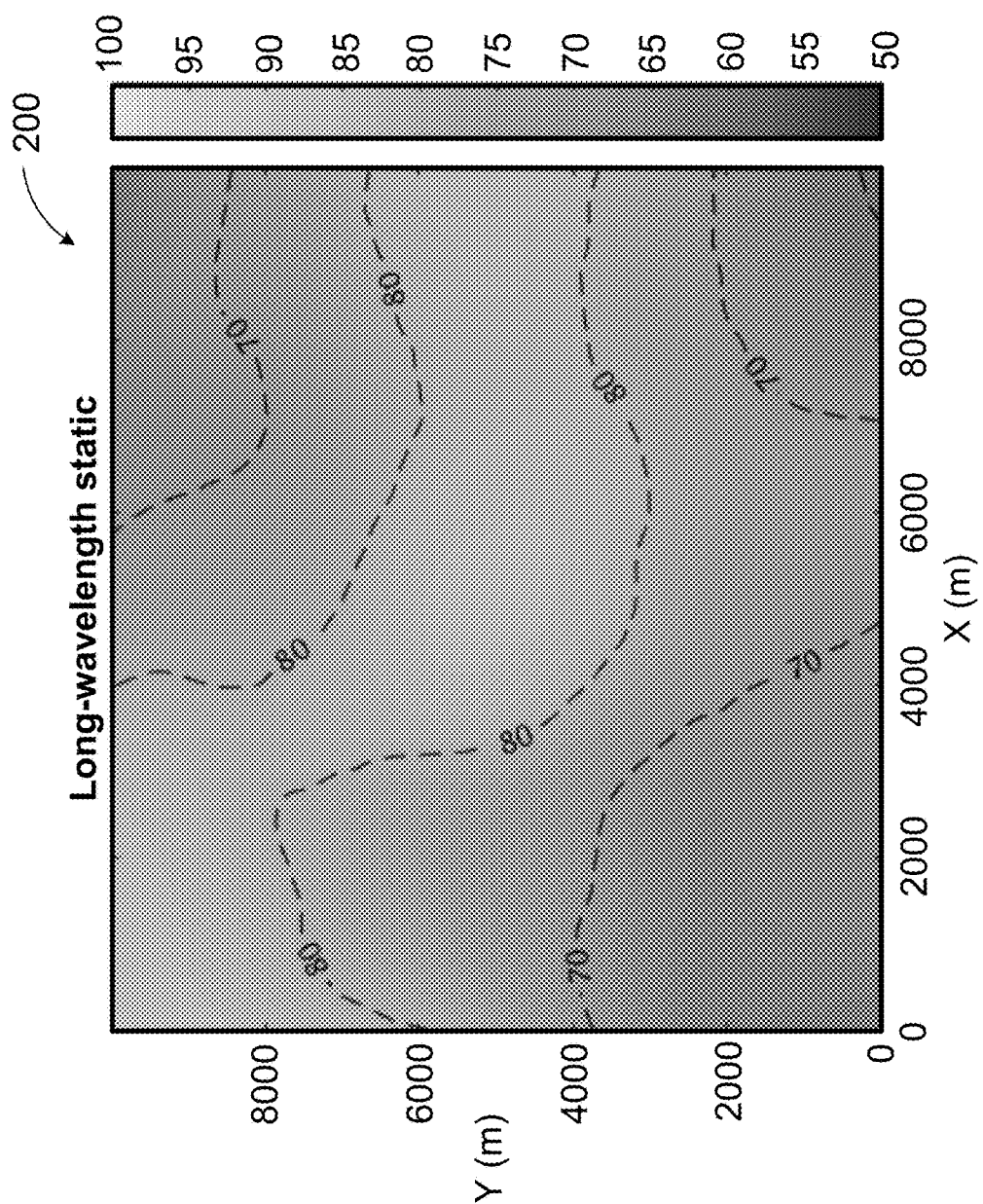
FIGS. 2-5 are graphs that illustrate a synthetic model of an output of a seismic data acquisition and processing system according to the present disclosure.
Figure 3:
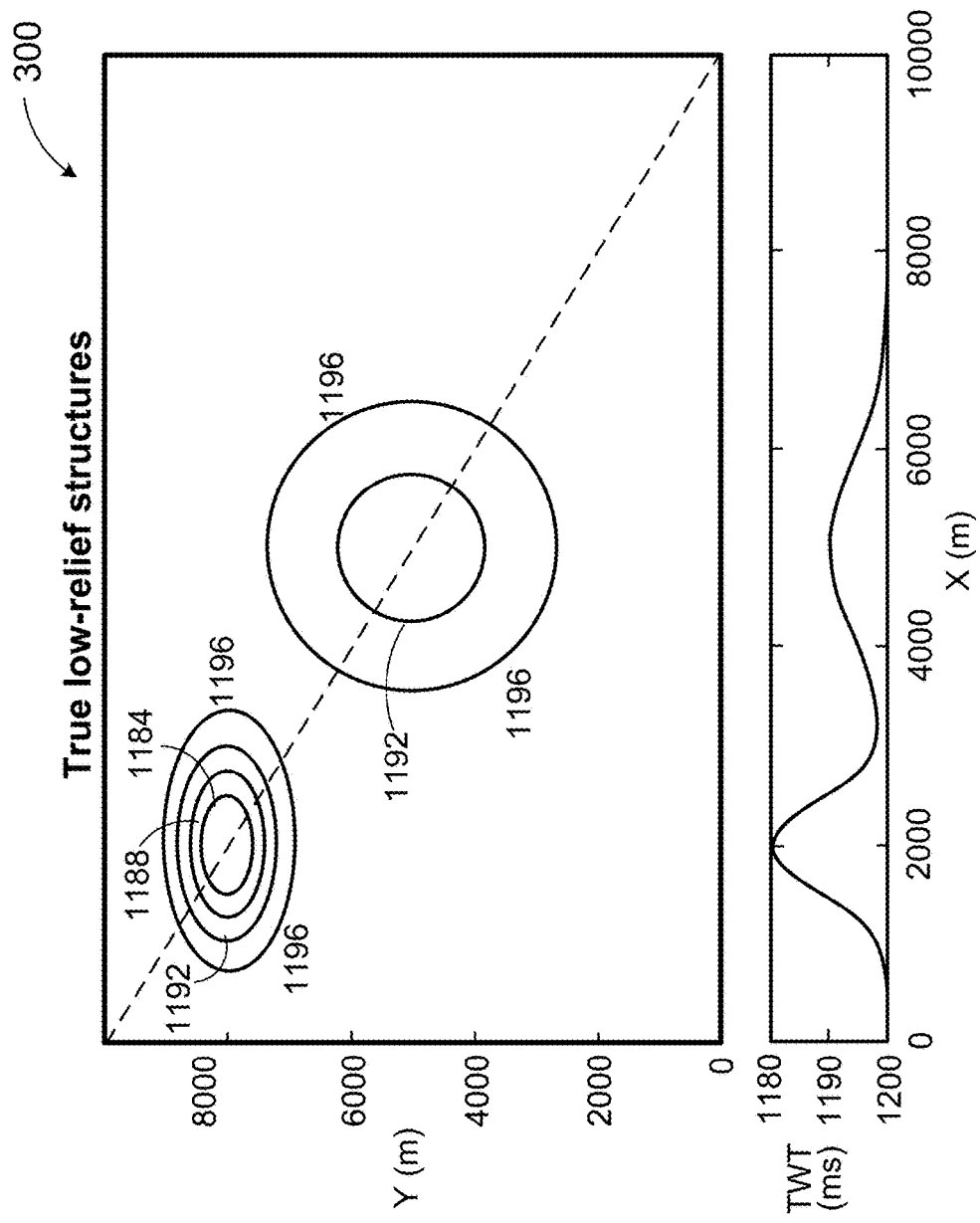
Figure 4:
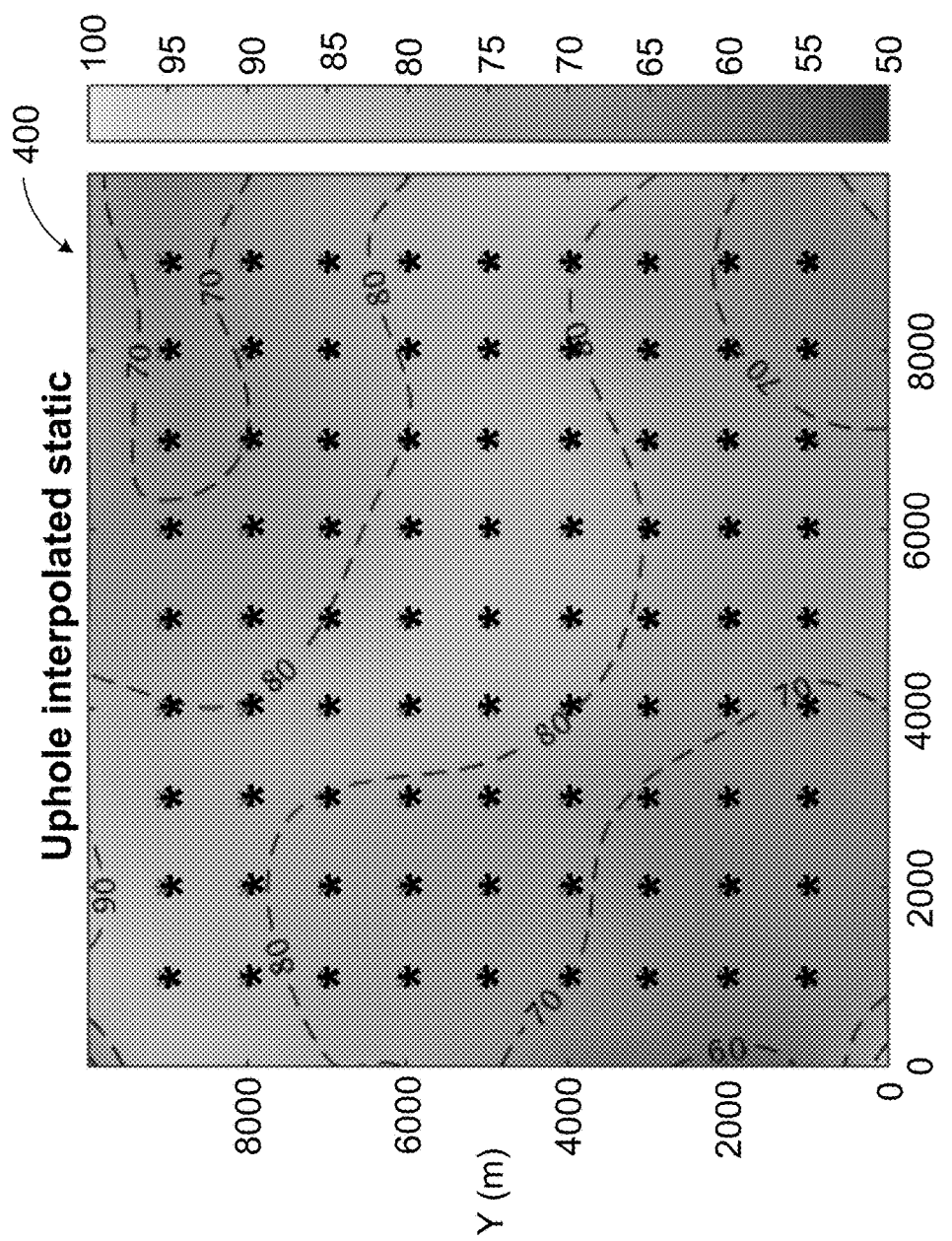
Figure 5:
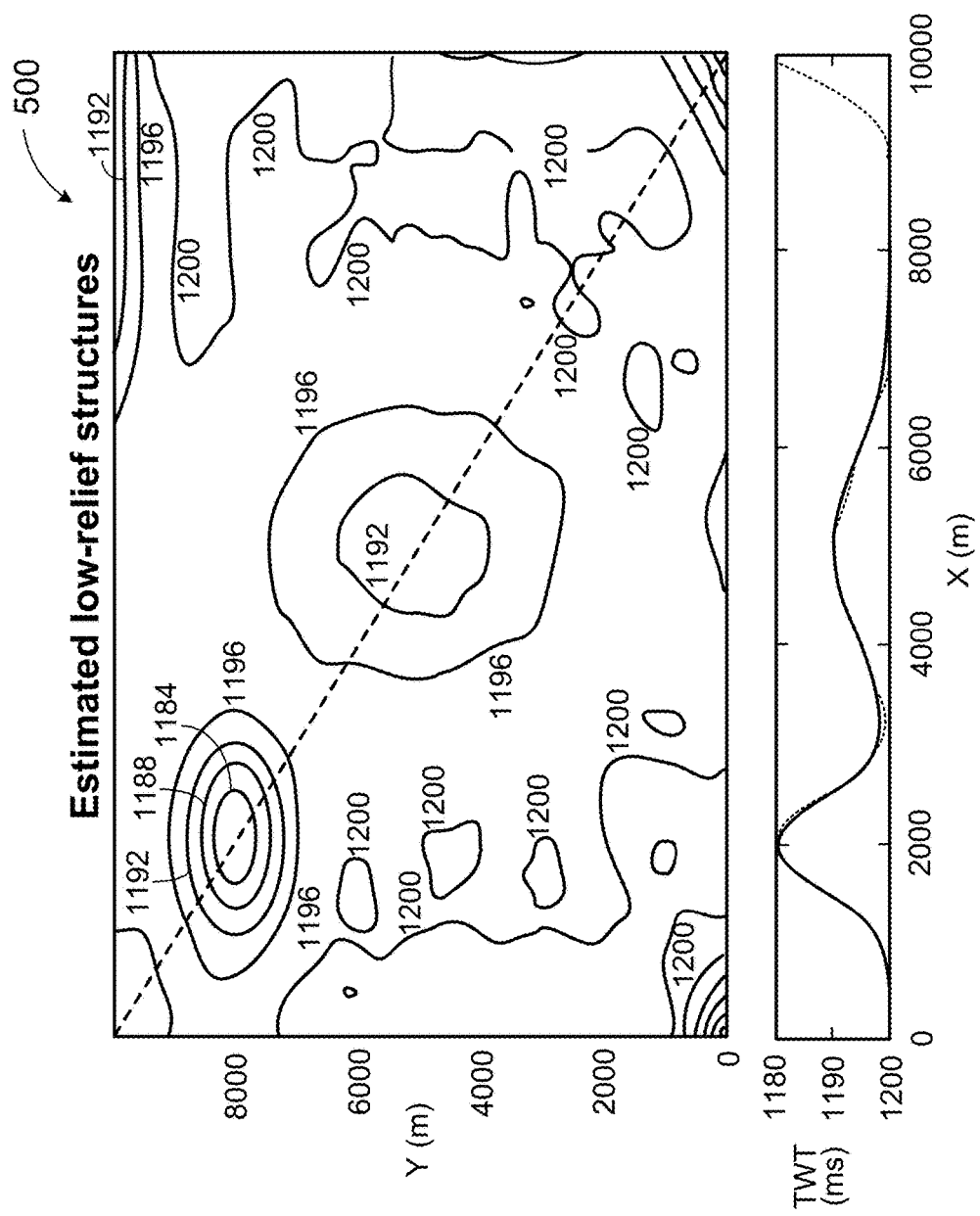

FIGS. 2-5 are graphs that illustrate a synthetic model of an output of a seismic data acquisition and processing system according to the present disclosure. For example, FIG. 2 shows a two-dimensional long-wavelength static model 200 based on depth below a terranean surface. FIG. 3 shows a two dimensional graphical representation 300 of true low-relief structures. FIG. 4 shows a two-dimensional borehole interpolated static model 400 based on depth below a terranean surface. FIG. 5 shows a two dimensional graphical representation 500 of estimated low-relief structures. To illustrate how the grid of boreholes can assist seismic exploration by resolving long-wavelength statics and deliver an accurate near-surface model, a synthetic example was simulated using the SEAM II Arid model (Oristaglio, 2015). Consider two low-relief structures in an area of interest of 10×10 km (as shown in FIG. 3). FIG. 2 shows true long-wavelength statics computed using the SEAM Arid velocity model assuming a seismic datum at 100 m depth. The largest structural uncertainty comes from errors in long-wavelength statics that distort the geometry and volume of the explored structures. Acquiring a patch of boreholes on a 1×1 km grid requires 81 wells (as shown in FIG. 4). Assuming that short-wavelength statics can be estimated from seismic, long-wavelength statics can be interpolated from boreholes into the entire volume and obtain reliable statics for the entire survey. FIG. 5 confirms reliable mapping of both 10 and 20 meters low-relief structures with borehole-based statics. Considering the larger exploration risks associated with low-relief structures, and the significant cost of drilling exploration wells, such targeted grids of boreholes could become a useful tool in a geophysical toolbox. DAS-based boreholes (described later) can provide direct and reliable static estimates not only for time imaging, but also depth imaging to avoid depth mis-ties often encountered in areas with complex near-surface conditions.

Figure 6:
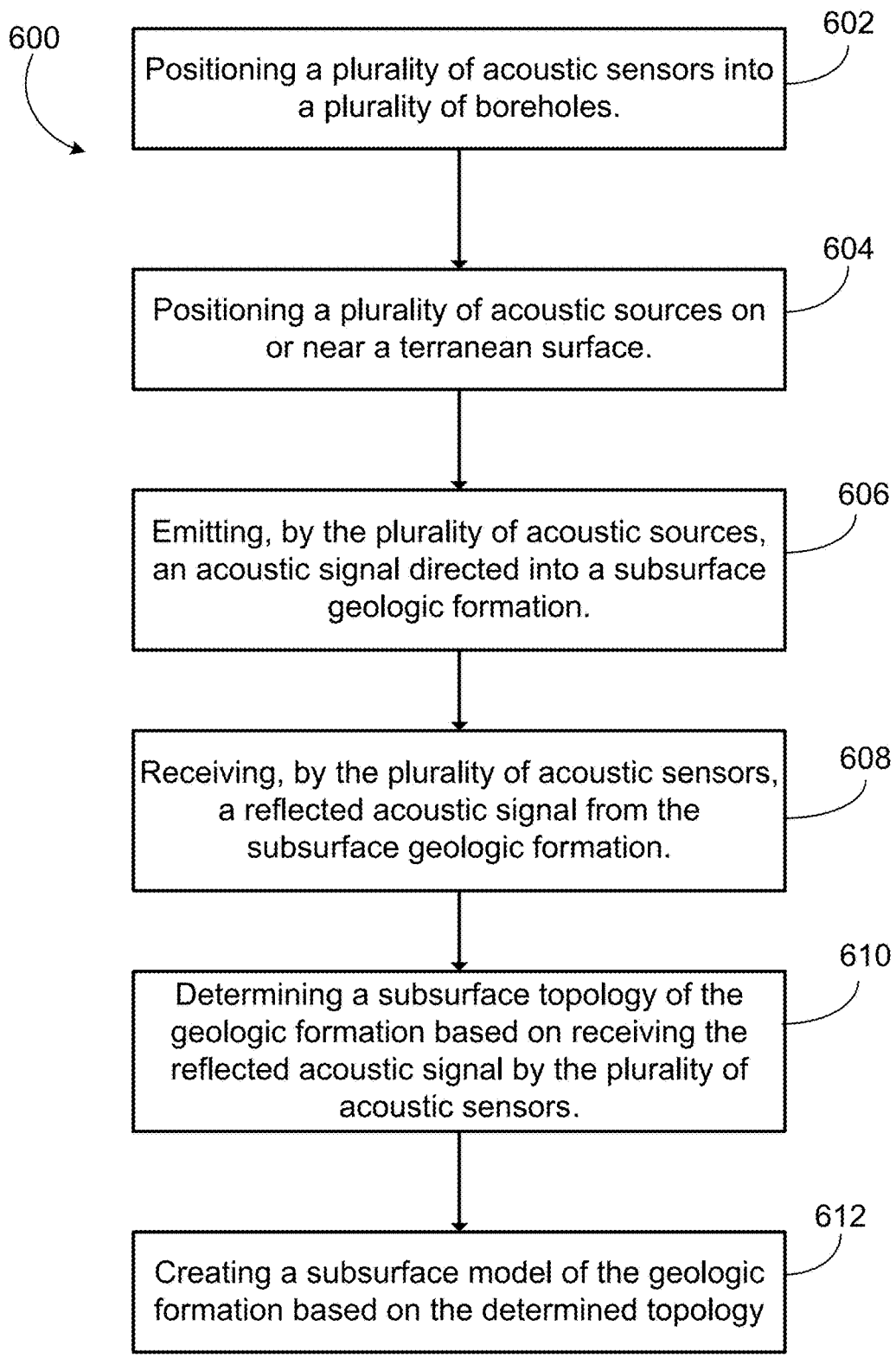
FIG. 6 illustrated an example method for generating a seismic image of a low-relief sub-terranean structure according to the present disclosure.

FIG. 6 illustrated an example method 600 for generating a seismic image of a low-relief sub-terranean structure. In some aspects, method 600 may be implemented by or with at least a portion of system 100 shown in FIGS. 1A-1C. Method 600 may begin at step 602, which includes positioning a plurality of acoustic sensors into a plurality of boreholes. Method 600 may continue at step 604, which includes positioning a plurality of acoustic sources on or near a terranean surface. Method 600 may continue at step 606, which includes emitting, by the plurality of acoustic sources, an acoustic signal directed into a subsurface geologic formation. Method 600 may continue at step 608, which includes receiving, by the plurality of acoustic sensors, a reflected acoustic signal from the subsurface geologic formation. Method 600 may continue at step 610, which includes determining a subsurface topology of the geologic formation based on receiving the reflected acoustic signal by the plurality of acoustic sensors. Method 600 may continue at step 612, which includes creating a subsurface model of the geologic formation based on the determined topology.

Figure 7:
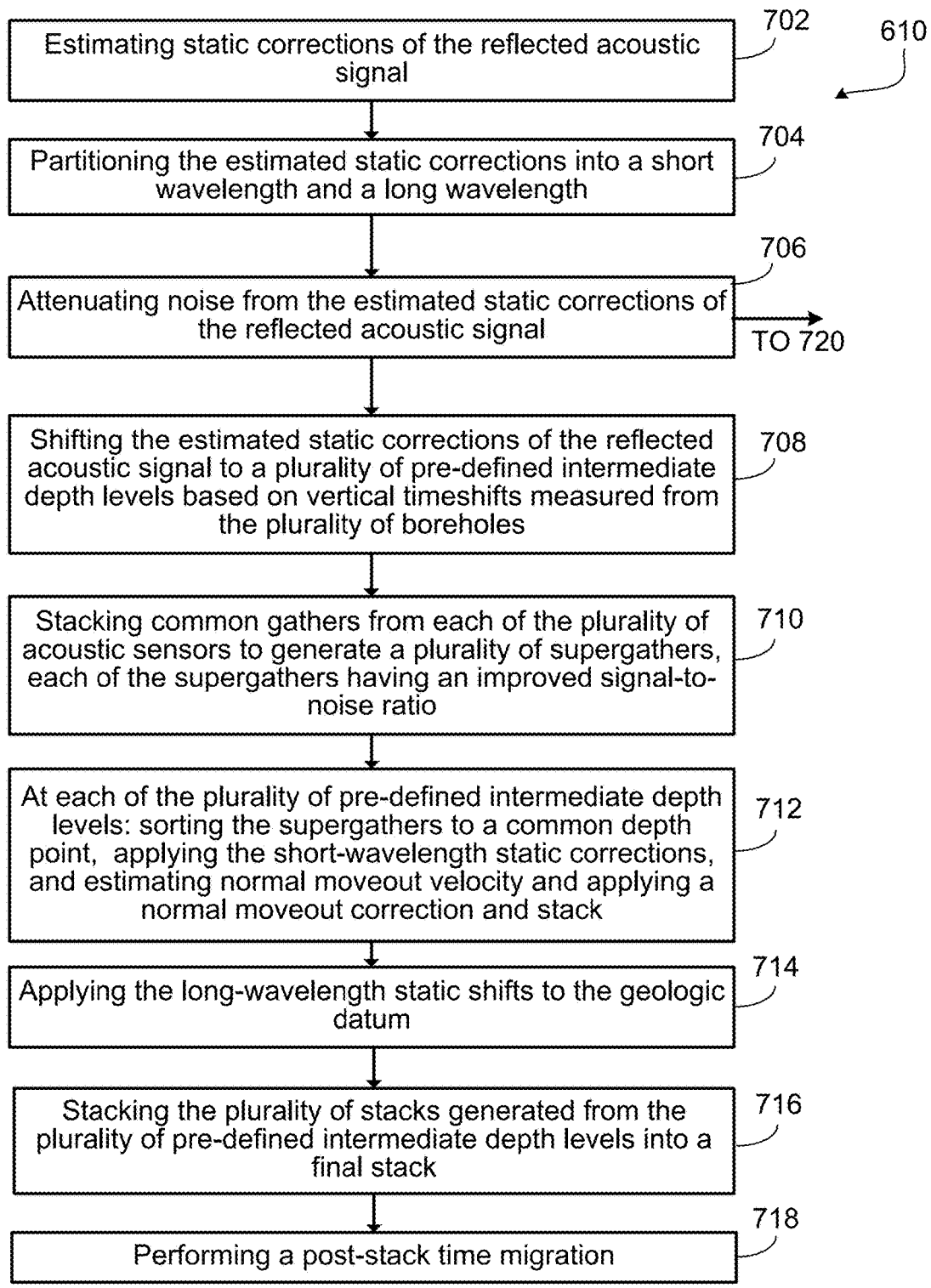
FIG. 7 illustrates an example implementation of a time imaging process flow of a seismic data acquisition and processing system according to the present disclosure.

In some aspects, step 610 may include implementing a time imaging model and a depth imaging model. FIG. 7 illustrates an example sub-method for step 610 for implementing a time imaging model, such as by the control system 150. The illustrated method for implementing a time imaging model may begin at step 702, which includes estimating static corrections of the reflected acoustic signal. The sub-method may continue at step 704, which includes partitioning the estimated static corrections into a short wavelength and a long wavelength. Method 700 may continue at step 706, which includes attenuating noise from the estimated static corrections of the reflected acoustic signal. The sub-method may continue at step 708, which includes shifting the estimated static corrections of the reflected acoustic signal to a plurality of pre-defined intermediate depth levels based on vertical timeshifts measured from the plurality of boreholes. The sub-method may continue at step 710, which includes stacking common gathers from each of the plurality of acoustic sensors to generate a plurality of supergathers, each of the supergathers having an improved signal-to-noise ratio. The sub-method may continue at step 712, which includes, for each of the plurality of pre-defined intermediate depth levels: sorting the supergathers to a common depth point, applying the short-wavelength static corrections, and estimating normal moveout velocity and applying a normal moveout correction and stack. The sub-method may continue at step 714, which includes applying the long-wavelength static shifts to the geologic datum. The sub-method may continue at step 716, which includes stacking the plurality of stacks generated from the plurality of pre-defined intermediate depth levels into a final stack. The sub-method may continue at step 718, which includes performing a post-stack time migration.

Figure 8:
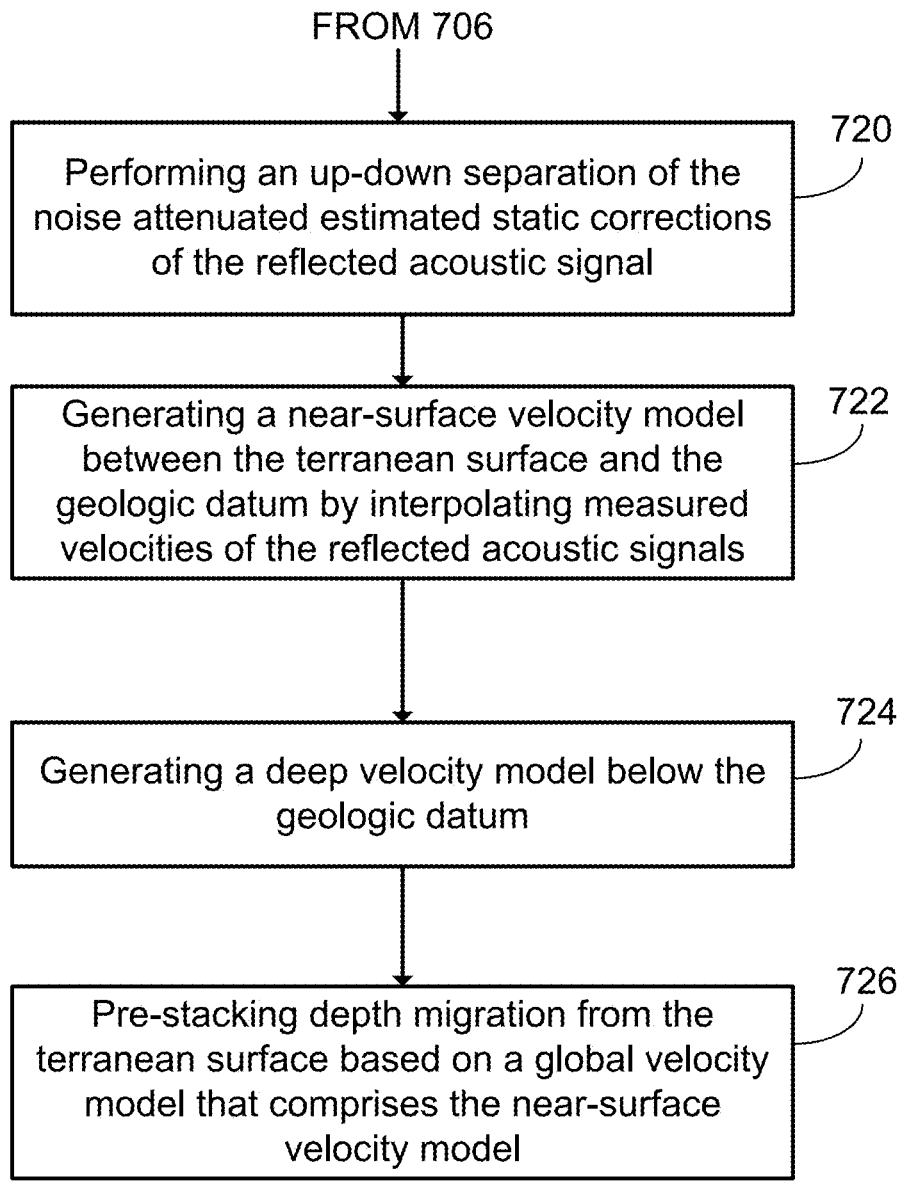
FIG. 8 illustrates an example implementation of a depth imaging process flow of a seismic data acquisition and processing system according to the present disclosure.

FIG. 8 illustrates an extension from step 706 for implementing a depth imaging model, such as by the control system 150, in step 610. The sub-method from step 706 may begin at step 720, which includes performing an up-down separation of the noise attenuated estimated static corrections of the reflected acoustic signal. The sub-method from step 706 may continue at step 722, which includes generating a near-surface velocity model between the terranean surface and the geologic datum by interpolating measured velocities of the reflected acoustic signals. The sub-method from step 706 may continue at step 724, which includes generating a deep velocity model at a depth below the geologic datum. The sub-method from step 706 may continue at step 726, which includes pre-stacking depth migration from the terranean surface based on a global velocity model that comprises the near-surface velocity model.

The present disclosure describes an integrated land seismic imaging system that uses distributed acoustic sensing (DAS) in a grid of shallow boreholes is proposed ("smart DAS boreholes"). This system allows simultaneous land near-surface characterization and subsurface imaging in a cost-efficient manner. Using this system, borehole velocity surveys can be acquired at any time with a single shot, since all depth levels may be recorded simultaneously. Dense grids of smart DAS boreholes accurately characterize long-wavelength statics and reduce uncertainty in exploration for low-relief structures. In addition, connecting multiple boreholes with a single fiber cable may enable efficient acquisition of seismic surveys with buried vertical arrays, which can provide superior images of the deeper subsurface than surface seismic, but with improved accuracy, since they bypass most of the near-surface complexities. The smart DAS boreholes can deliver on-demand surveys that simultaneously characterize the near surface and perform deep reflection imaging of oil and gas targets for exploration, development, or reservoir monitoring.

As described, implementations of the present disclosure may include a seismic acquisition scheme that has far fewer channels than surface seismic, that addresses both data quality and near-surface challenges by burying sensors in the subsurface. In particular implementations of the system, one component is the smart distributed acoustic sensing (DAS) borehole, a shallow hole (50-500 m deep) instrumented with cost-effective optical DAS fiber acting as a seismic sensor.

Smart DAS boreholes may provide direct measurements of shallow velocity variations and reduce the creation of false structures caused by a poorly characterized near-surface model arising from indirect methods such as refraction tomography. Using a network of smart DAS boreholes connected by a single fiber (for example, shown in FIG. 1C) allows the proposed fiber-optic system to perform new seismic acquisition with buried vertical DAS arrays. Such acquisition is achieved with relatively small incremental cost by running connecting fiber cables between DAS boreholes as shown in FIG. 1C. The trenched connecting cables also record useful surface seismic data, similar to that recorded by conventional horizontal geophones. If omni directional DAS cables were used (as described in particular implementations), seismic data similar to that detected by conventional vertical geophones would also be recorded. The resulting geophysical surveys can be used for exploration of low-relief structures, detailed reservoir geophysics, or permanent monitoring.

Direct measurements can provide more reliable and accurate characterization of near-surface properties. In the past, shallow boreholes (known as boreholes) were used to produce near surface velocity profiles to calculate the static corrections needed to reduce the influence of the near surface on seismic depth images. Conventional seismic boreholes require moving a single geophone up the borehole and using a hammer or weight drop source to obtain first breaks. Data quality is usually questionable for several reasons. First, the data are acquired using a wall-lock geophone in an open hole that results in variable receiver coupling. The need to repeat the shot at each receiver level also results in variable source signatures. It is difficult to achieve accurate depth control due to manual operations and at large depths; multiple excitations of the weak source are required to achieve good first breaks. Operationally, the borehole crew must be continuously on site during drilling, to enter the hole and perform the survey as soon as it is completed to avoid potential borehole collapse. This makes borehole measurements difficult and expensive, limiting their usage.

The proposed smart DAS borehole setup may acquire borehole seismic data using relatively cost efficient fiber-optic DAS cables. The DAS cable is deployed in the hole immediately after drilling and can be permanently left in place due to its low cost. Every meter of DAS cable may act as a seismic sensor, enabling a multilevel array covering the entire length of the borehole from top to bottom. A grid of low-cost boreholes allows the direct estimate of long-wavelength statics corrections required for reliable imaging of low-relief structures.

Using disposable DAS sensors, as can be used in particular implementations of the system 100, may allow for the recording of higher quality seismic reflection data with buried receivers. In the case of smart DAS boreholes, reflection records can be obtained with the entire vertical antenna similar to seismic offshore surveys. Thus, the smart DAS borehole system allows for both near-surface characterization and targeted deep imaging simultaneously.

A field experiment for the smart DAS boreholes has been conducted in Saudi Arabia. A smart DAS borehole array comprising a two-dimensional line of boreholes recording a reflection survey using a single continuous fiber cable running through multiple wells was installed. Next, the data quality of DAS boreholes was assessed and compared with a standard borehole acquisition using conventional clamped geophones. The test demonstrated that a two-dimensional survey with vertical DAS arrays can deliver robust seismic data for subsurface imaging. Further, a direct comparison of prestack data and images obtained using the DAS system and legacy surface seismic with geophones was performed.

Figure 10A:
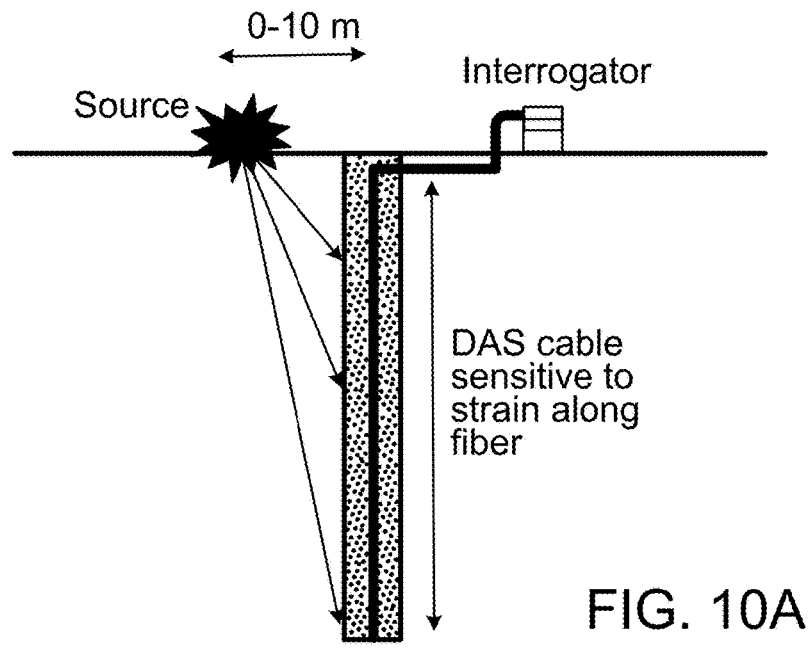
FIG. 10A shows a schematic diagram of an example implementation of a distributed acoustic sensing (DAS) system.

The field test was conducted to validate both near-surface characterization and deeper subsurface imaging in an onshore area in Saudi Arabia. The first component of the field test was the borehole acquisition shown schematically in FIG. 10A. A tactical tight-buffered DAS fiber cable was installed in the open hole and then backfilled with an appropriate material providing good coupling between the fiber and formation. To map DAS channels to their respective surface and borehole locations, a process called distance calibration was used which compares points of known physical location and measured optical distance along the fiber. The fiber was connected to a mobile interrogator unit and the seismic source was placed at the surface close to the well. Several sources were used for testing, including an accelerated weight drop (AWD), vibrator pulse, and a conventional vibrator sweep. Together with DAS acquisition, conventional borehole measurements with a single-receiver geophone instrument were also performed in several wells for comparison and verification purposes.

Figure 10B:
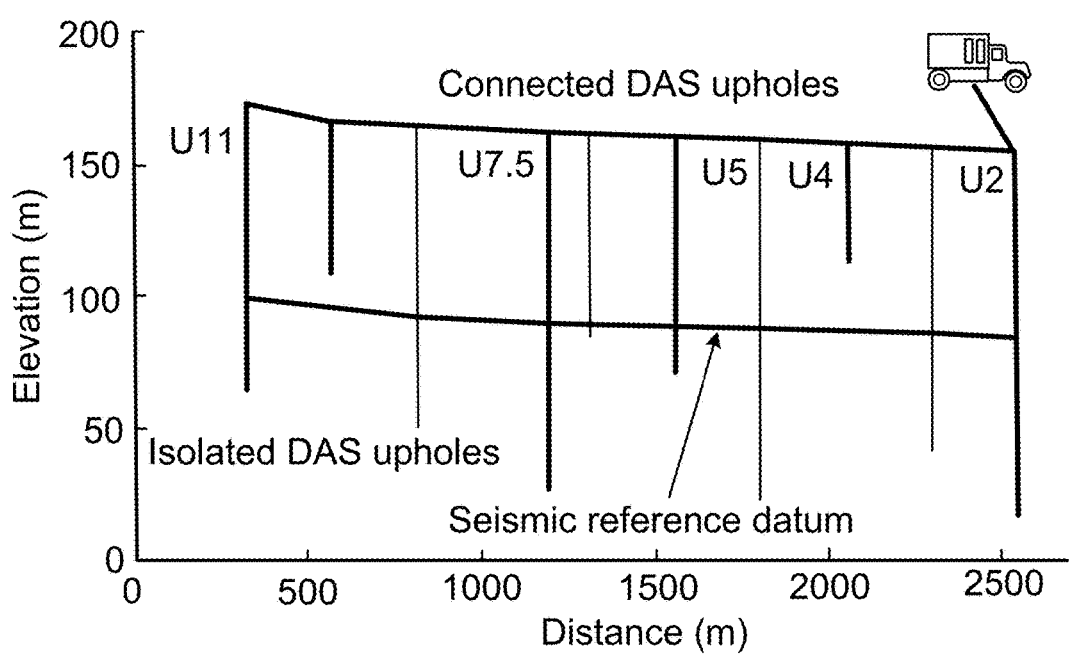
FIG. 10B shows a schematic diagram of an example field geometry of simultaneous DAS recordings in multiple wells acquired with a carpet of acoustic sources.

The second phase of the field test was to acquire a reflection survey using the same smart DAS boreholes. While placing a separate DAS fiber in each hole is suitable for a dedicated borehole survey, it may require multiple interrogators for reflection surveys which may be expensive and impractical. To improve efficiency, multiple boreholes were connected using a single continuous fiber (much like the system 100 shown in FIG. 1C), which requires running fiber up and down each hole with a loop at the bottom. Surface sections of the cable were trenched at 1 m depth. By installing a continuous fiber in the holes and trenches, simultaneous acquisition of all DAS channels with a single interrogator unit is enabled. Several two-dimensional shot lines were acquired using vibrators over the area of interest with a 10 m inline and crossline spacing. This resulted in 2850 source locations and around 1200 DAS channels (using 4 m sampling), a quarter of which were downhole. Actual receiver geometry of the test is shown in FIG. 10B where the dotted line indicates the connected DAS boreholes used for imaging and the solid line shows the isolated boreholes. Since the fiber is predominantly sensitive to the strain along the axial direction, downhole channels were best suited for recording reflected, near vertically propagating P-waves which were used for imaging. Surface channels are less sensitive to reflections, but record well-sampled ground roll for surface-wave inversion, and capture strong refracted arrivals required for tomography. The fiber remained installed at the site allowing repeated borehole measurements and/or reflection surveys to be acquired to address seasonal variations or for seismic monitoring.

Figure 11A:
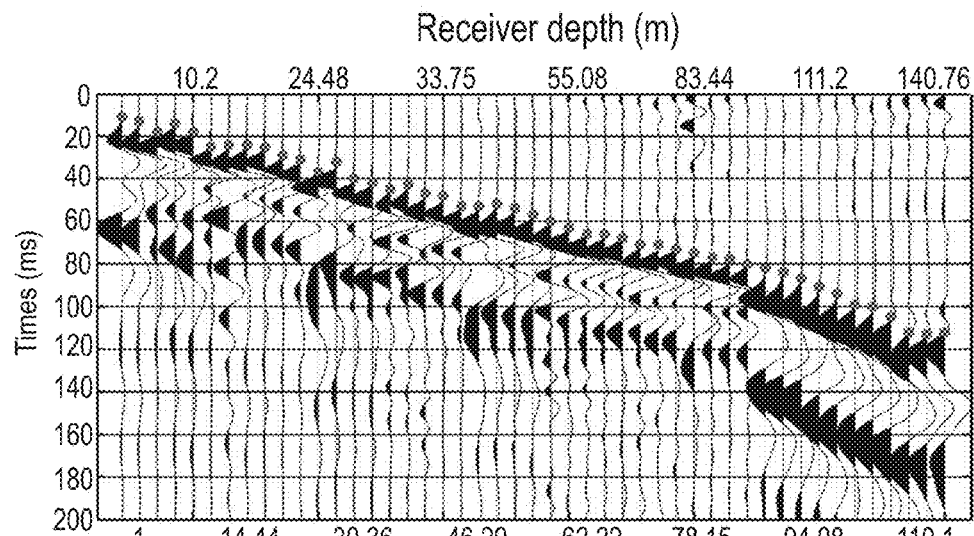
FIGS. 11A-11C are graphs that show waveforms recorded for different boreholes that include acoustic sources and acoustic sensors.

One goal of the tested acquisition system is to better characterize the near surface for more accurate imaging. First, the data obtained using conventional and smart DAS boreholes for direct near-surface velocity measurement were compared. A conventional borehole gather acquired using an AWD source and wall-lock geophone is provided in FIG. 11A. In this example, the conventional borehole configuration uses geophones and AWD (stack of 10 sources at each depth location) and a channel spacing of 2 m is used above 50 m depth and 4 m below. The source offset was 5 m. At each depth the source is repeated several times and data stacked to produce the output shown. This may partly explain some of the early arrival waveform and first-break pick variations observed in the data. Beyond 100 m depth, a substantial change in frequency content and apparent velocity of the first arrivals was observed, which was most likely caused by changing lithology.

Figure 11B:
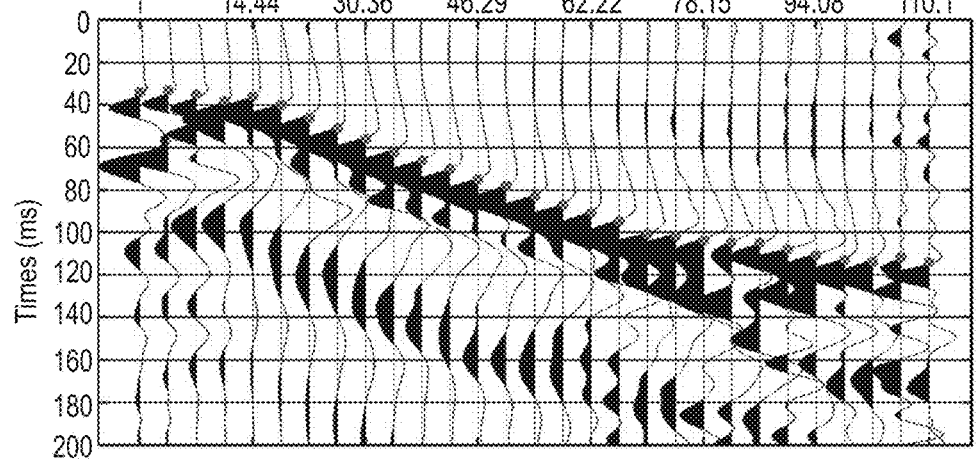
Figure 11C:
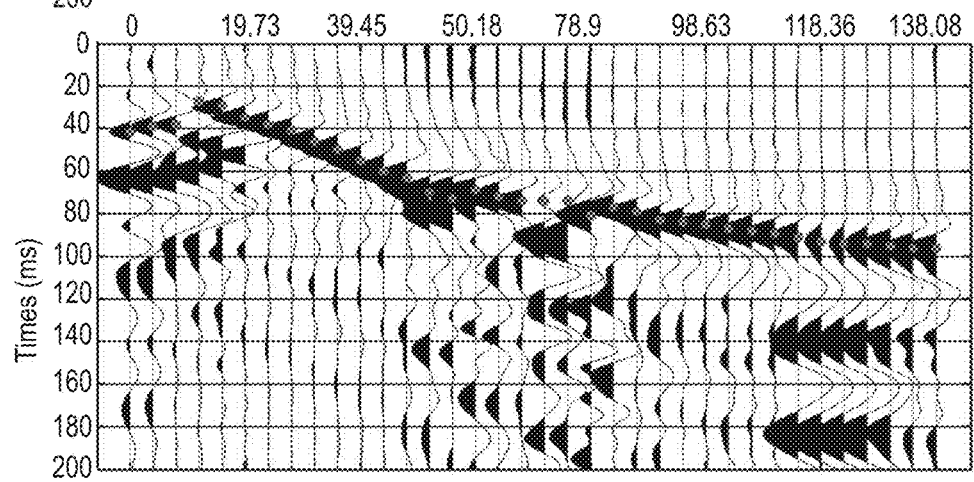

Smart DAS borehole gathers are shown in FIGS. 11B and 11C for comparison. The early arrival waveforms shown in FIG. 11B were also acquired by stacking 10 repetitions of an AWD source. Since all depth levels can be recorded simultaneously by the DAS fiber, the acquisition was much faster and the resulting waveforms more consistent between channels, with high-quality waveforms observed from the surface to a total depth of 110 m. Note that the gathers shown in FIGS. 11A and 11B were from different locations so a direct comparison of the picked times cannot be made. However, DAS waveforms are generally of similar or better quality compared to the conventional borehole.

Figure 12A:
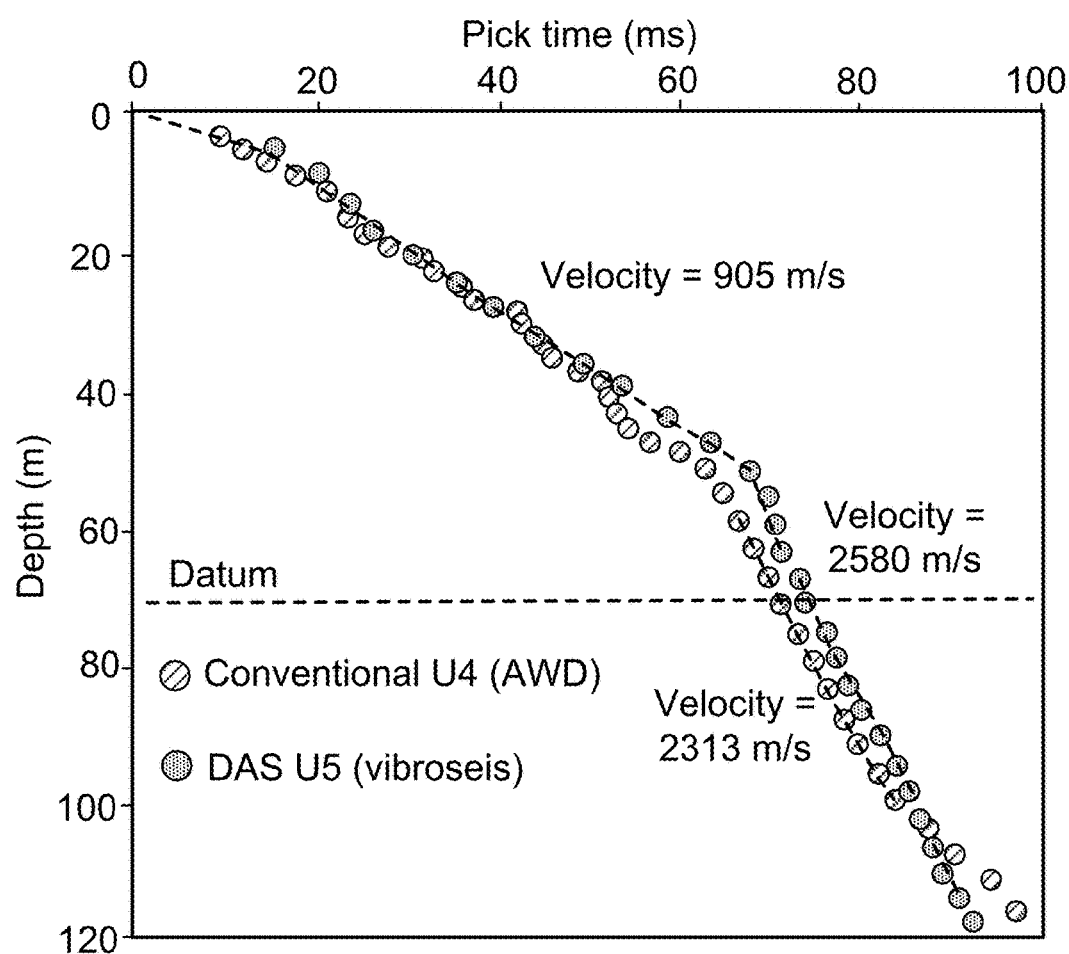
FIG. 12A shows a graph of comparing pick time and depth for adjacent wells using conventional and DAS systems.

The DAS borehole shown in FIG. 11C was acquired in an adjacent well (around 300 m away) to the conventional borehole (FIG. 11A) using 10 vibroseis sweeps (8-80 Hz). As in FIG. 11B, consistent early arrival waveforms were observed that were suitable for picking. Travel time curves are compared in FIG. 12A for conventional and DAS picks from these adjacent wells. A geometric correction has been applied to convert the picks to equivalent vertical travel times, considering the actual source location with respect to the borehole. In general, the picks show good agreement although there was a slight deviation in the observed velocities below 40 m, which is not unreasonable given the nature of the near surface in arid environments.

Figure 12B:
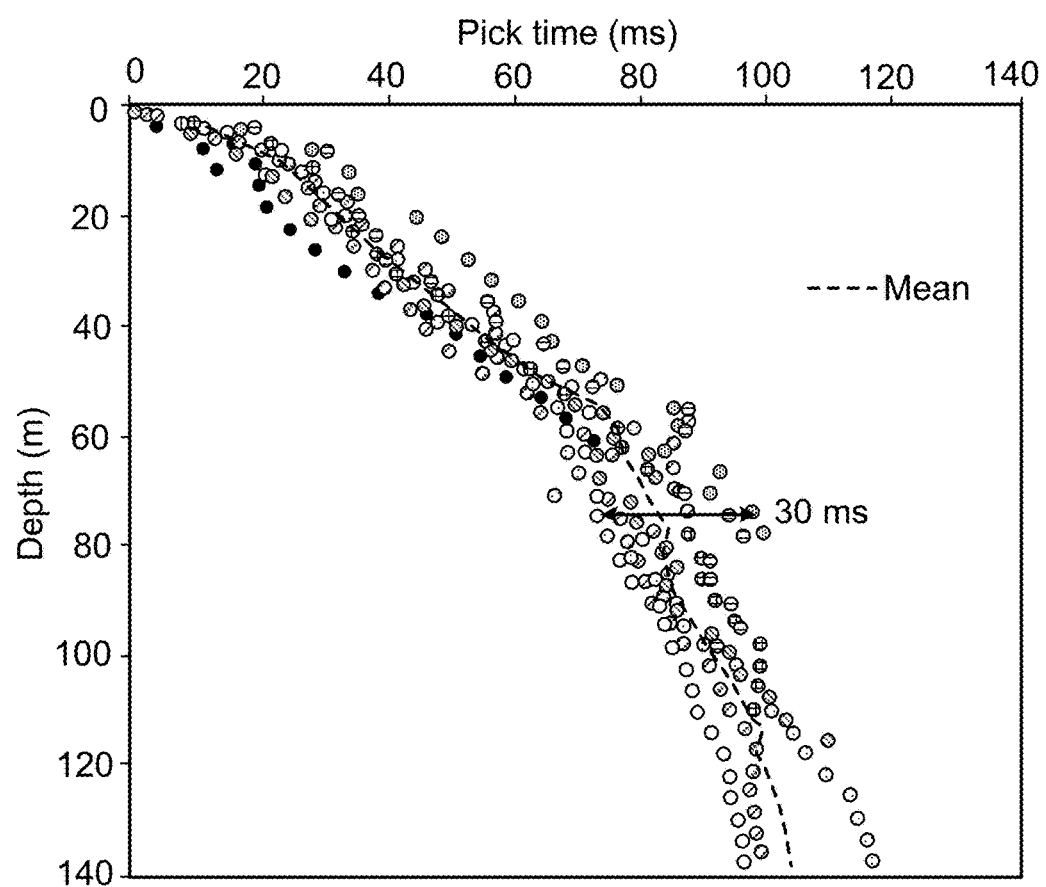
FIG. 12B shows a graph of comparing pick time and depth for adjacent wells using a DAS system and vibroseis acoustic source.

All first-break picks for the 10 DAS boreholes acquired using vibroseis sweep data are plotted in FIG. 12B. While the general trend of the picks is similar between wells, clear lateral velocity variations are apparent even over such a small scale of a few kilometers. For example, at a depth of around 80 m, variations of 30 ms were observed in one-way travel times. These variations represent mid- to long-wavelength statics that need to be accurately estimated to reliably image low-relief hydrocarbon structures.

The first smart DAS borehole seismic experiment demonstrated that excellent data quality, comparable if not better than those obtained using conventional methods, can be obtained for detailed near-surface estimation. While conventional borehole acquisition requires multiple source excitations at the surface and repositioning of the geophones, the smart DAS borehole survey can be acquired with a single shot, resulting in more efficient acquisition and stable waveforms. Besides the improved data quality, DAS boreholes present several other advantages over conventional methods. During acquisition of conventional borehole data, any collapse of the borehole may lead to the loss of the tool, resulting in delays. For DAS boreholes, the risk is greatly reduced since the fiber is installed and backfilled right away. Entering most boreholes with DAS cables immediately after drilling has proven straightforward, and fluid or solid backfill, cementation, or bentonite packing represent practical solutions providing good acoustic coupling. In addition, the borehole survey can be repeated in the future and can also be incorporated as part of a seismic reflection survey using multiple boreholes.

Figure 13:
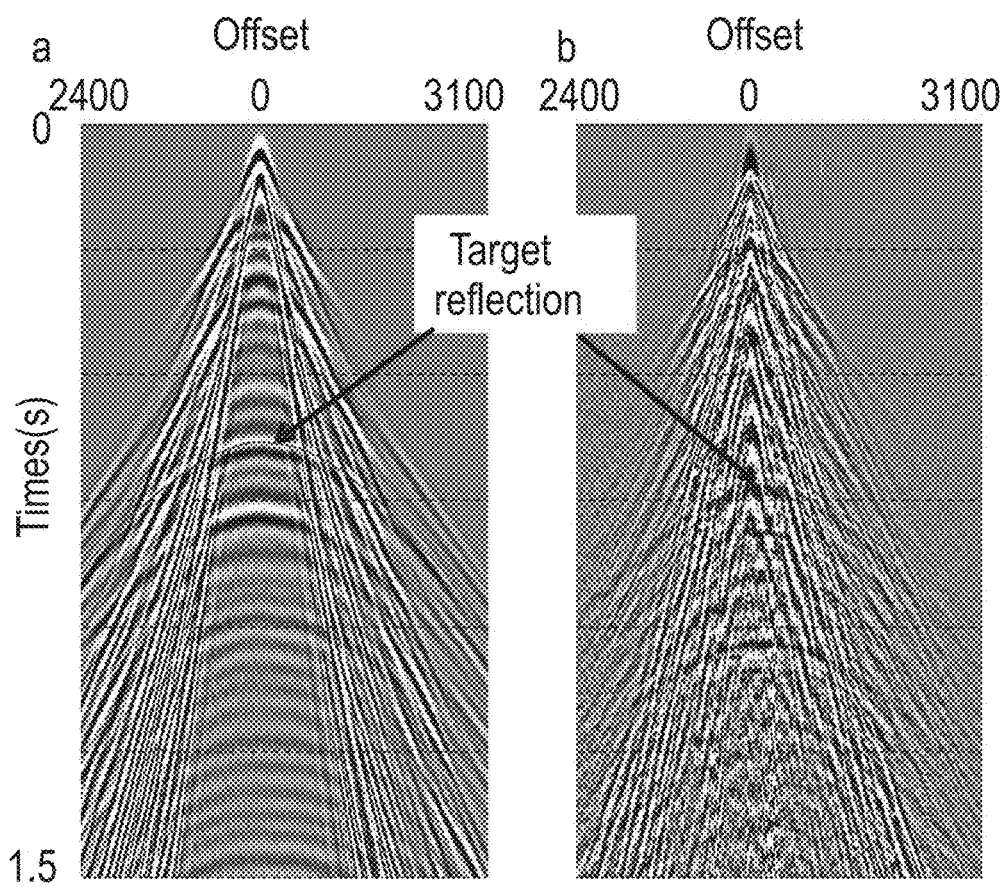
FIG. 13 shows a graph that illustrates a comparison of synthetic and real common-receiver gathers.

Reflection imaging of the deeper subsurface is another opportunity enabled by the smart DAS borehole concept. Seismic data acquired in arid environments are often contaminated by very strong noise caused by multiple scattering in the near surface and surface waves. Buried receivers can partially overcome this problem and can provide better quality data than conventional surface seismic. Similar findings are made with the buried DAS data, where with increasing sensor depth we observe more and more reflection signals, and less contamination by horizontally propagating energy in the near surface. Synthetic and real data at a depth of 130 m are compared in FIG. 13 showing that the field data are of sufficient quality to allow the observation of the target reflection signal on the raw gather.

Figure 14:
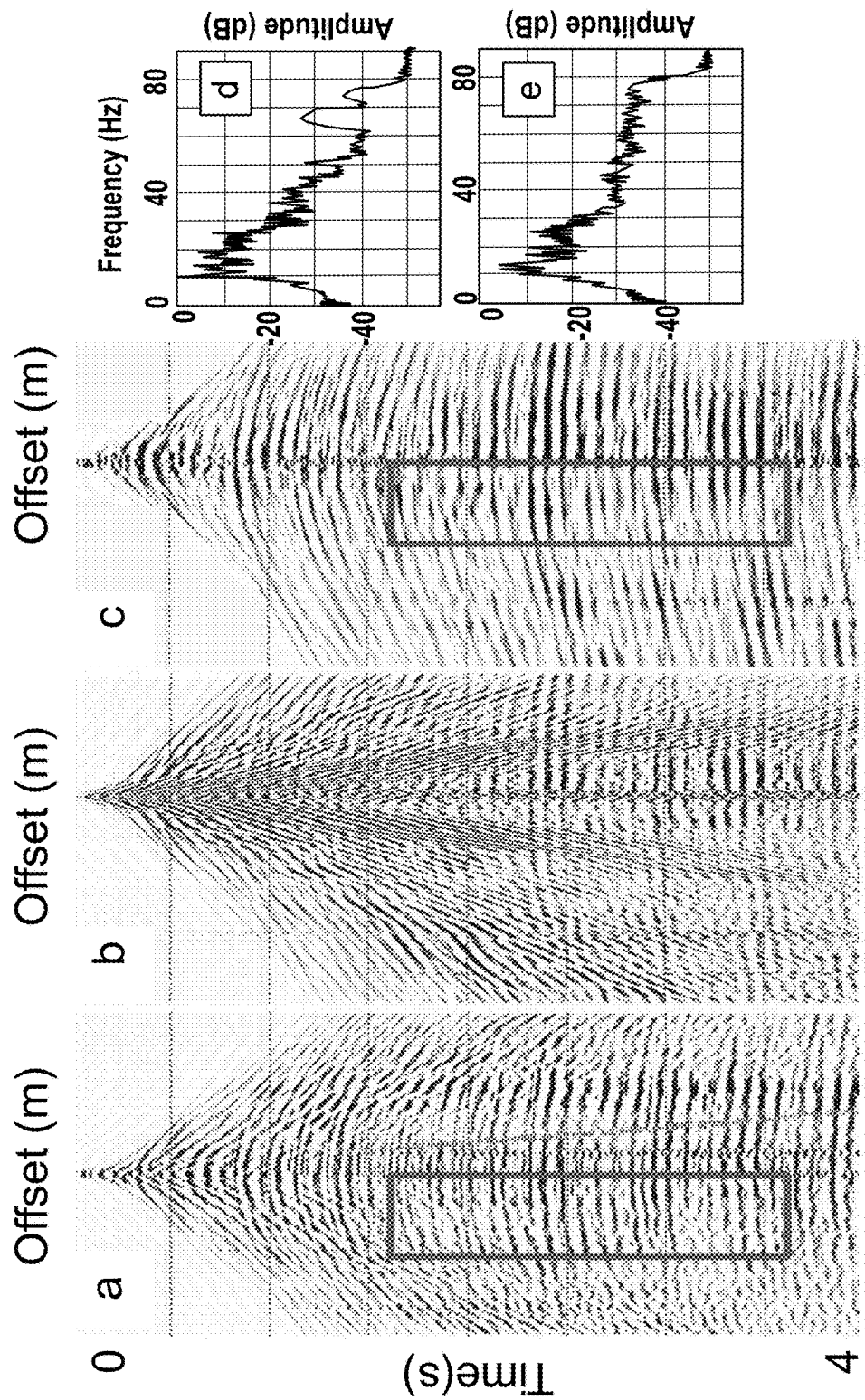
FIG. 14 shows several graphs that illustrate comparisons between pre-stack common-receiver gathers obtained with surface geophone and a DAS system.

It may be of interest to benchmark the DAS data against the legacy three-dimensional seismic. FIG. 14 shows common-receiver gathers obtained using a single DAS channel in a shallow hole and legacy data using surface geophone arrays. Excellent kinematic agreement was observed between reflected signals on both data sets. DAS data show more details because of the finer source sampling of 10 m compared to 60 m for legacy data. The lower levels of linear noise on legacy data are explained by the use of 72 geophone and five vibrator arrays in the field, which efficiently suppress ground roll and other arrivals with low apparent velocity. After a linear noise removal is applied to the DAS data and decimate to the same spacing, we see closer agreement between DAS and legacy geophone data, especially for shallow reflectors that were heavily obscured by ground roll (as shown in portion "c" of FIG. 14). Since a linear 8-80 Hz sweep was used for both acquisitions, spectra of the DAS and geophone gathers can also be directly compared (as shown in portions "d" and "e" of FIG. 14). They appear quite similar confirming the broadband nature of the DAS receivers and general equivalence with geophones.

While the DAS field data set as previously described contains only six vertical arrays with irregular and large spacing, a robust two-dimensional image was obtained that can be compared with the legacy surface seismic image. To make the comparison fair, an equivalent two-dimensional subset was selected from the legacy three-dimensional data, containing one receiver line and one parallel high-density shot line with spacing of 60 m for both. The same time processing was applied to both data sets and used the same legacy velocity and no statics. To compensate for the lack of source/receiver arrays during DAS acquisition, linear noise removal was applied to the fiber-optic data, whereas field arrays were relied on for legacy data. One non-standard step for DAS data processing was bringing all the receivers to the same depth level for time processing and stacking. This can be done in several ways, including using direct arrival travel times, via wave-equation re-datuming, or by interferometric approaches. In this work, vertical travel times were picked on the borehole data and re-datum all traces to the surface using the resulting statics. With this approach, all depth levels can be merged to form a final stack with significantly improved signal-to-noise ratio compared to individual stacks from a single depth.

Figure 15:
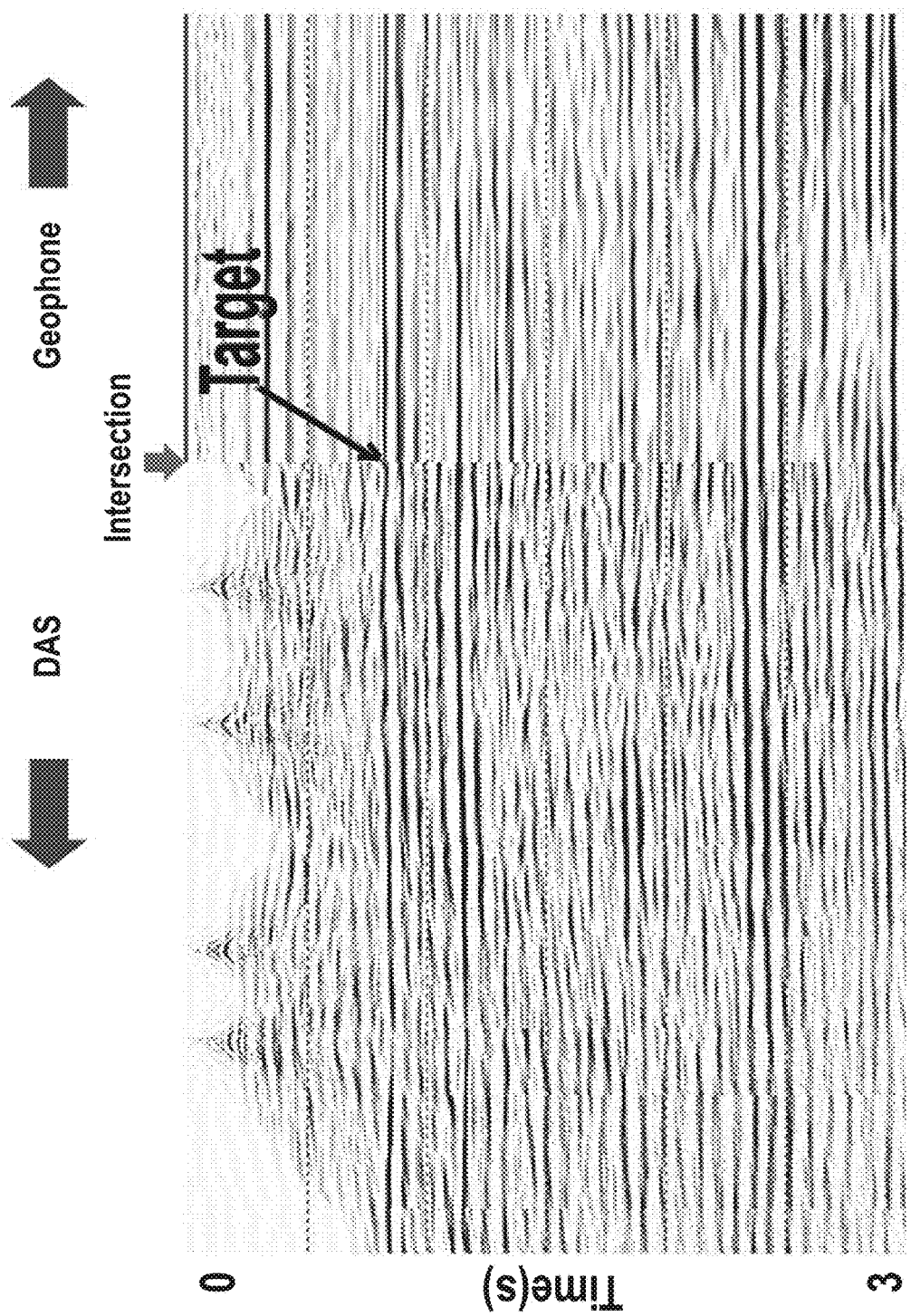
FIG. 15 shows a graph that illustrates a comparison between images obtained with a DAS system and a conventional seismic system.

FIG. 15 compares brute seismic stacks obtained with DAS and legacy geophone data. Both shallow and deep reflectors are robustly imaged on the DAS data similar to surface seismic. DAS and legacy lines intersect at 45 degrees, so the DAS image is shown on the left side and the legacy image on the right side. An excellent tie of both images is seen at the intersection point, both for the target reflector as well as other reflectors, all the way to 3 seconds. This confirms the excellent sensitivity of DAS vertical arrays to reflection energy, and the ability to obtain equivalent images to surface seismic, despite large spacing between shallow holes. Further processing and refinement of the velocity model should improve the image. Likewise, depth imaging can be performed using a model that has calibrated near-surface velocities obtained with the DAS boreholes.

The smart DAS borehole concept provides many more opportunities in terms of oil and gas exploration of complex prospects, such as low-relief structures. If there is significant uncertainty in the near-surface model that may impact exploration, then acquisition of new on-demand smart DAS boreholes can be requested. The drilling crew predrills all the boreholes and installs the DAS fiber. Then the recording crew comes and records all borehole surveys with a single shot/sweep per borehole (or several shots for stacking). Decoupling the drilling/deployment phase from the borehole acquisition can minimize risk, cost, and acquisition time. Efficient acquisition using a strong energy source such as vibroseis will allow complete acquisition of an borehole with a single sweep. This may deliver additional benefits, such as acquisition of shallow vertical seismic profiles (VSPs), to help identify multiple generators in the near surface that are typically missed by conventional VSP surveys, due to poor shallow data quality. If the on-demand concept is adopted, then it becomes practical to perform regular grids of boreholes over prospects of interest. Such borehole surveys can be fit-for-purpose solutions in areas with near-surface challenges.

The reasons include: a grid of smart DAS boreholes can completely resolve long-wavelength statics and deliver a near-surface model with the accuracy needed for low-relief structures; buried data are of higher signal-to-noise ratio compared to surface reflection data and can provide angle coverage and images comparable to surface seismic; combined smart DAS boreholes and surface seismic survey (in other words, using the same sources) offers a unique apparatus for characterizing the near surface through one-way tomographic inversion; and the combined survey is a self-contained package that can de-risk prospects of interest.

Figure 16:
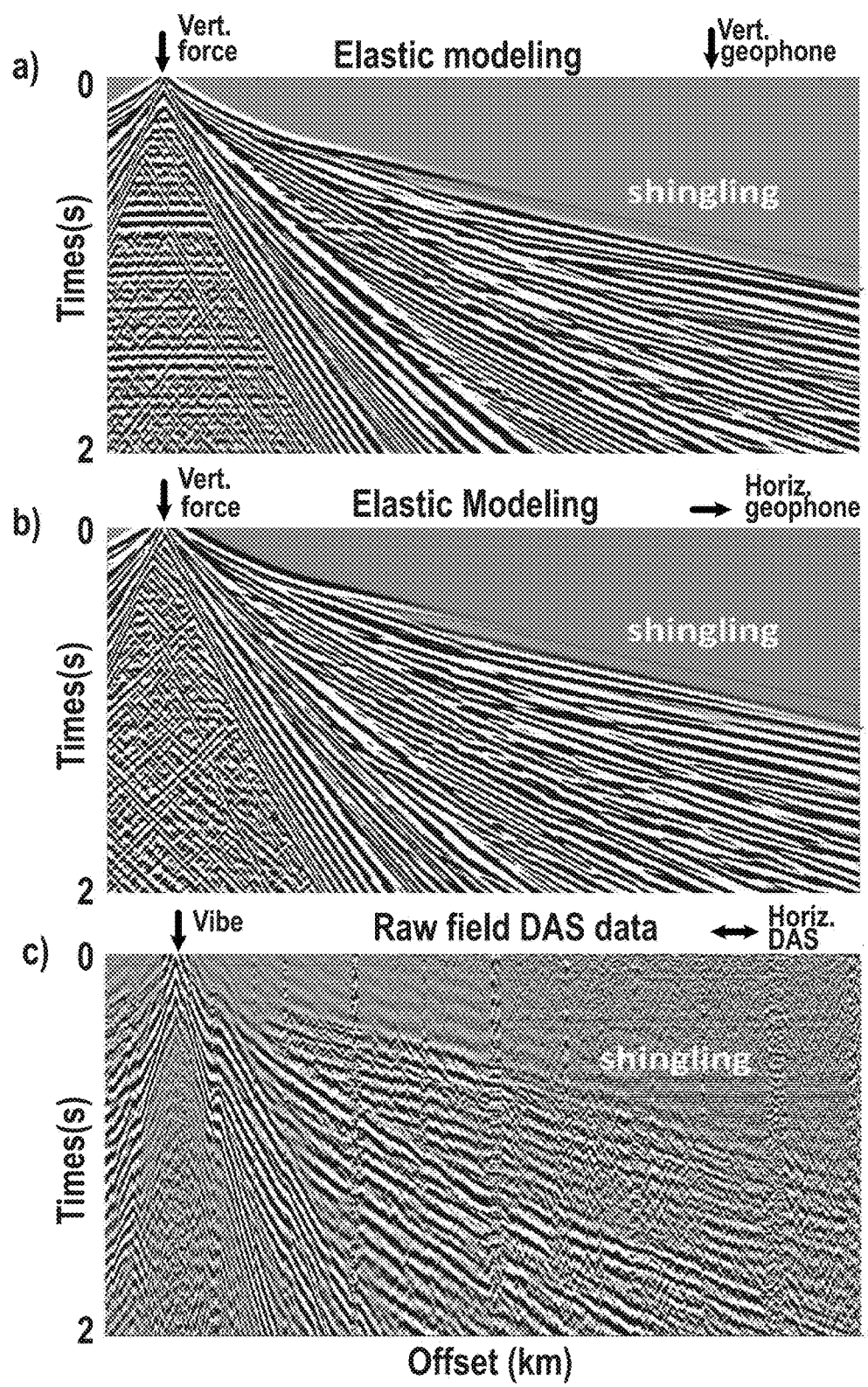
FIG. 16 shows graphs that illustrate a comparison between synthetic and field data for an elastic modeled vertical component, a horizontal component, and a field gather for a DAS system.

Fiber trenched along the surface also appears to record excellent data that could be readily compared to modeled elastic responses (as shown in FIG. 16). As expected, the mostly axial directivity of the fiber suggests it is more similar to horizontal geophones. Unlike vertical geophones, both DAS and horizontal geophones show little evidence of reflections. Well-sampled refraction arrivals and groundroll can be readily used for refraction tomography and surface-wave inversion. The excellent quality of shallow trenched DAS data suggests that P-wave surface seismic imaging can be within reach, provided omnidirectional DAS cables are used.

In another test of the described smart DAS boreholes, permanent seismic monitoring with buried sensors were successfully demonstrated in a $CO_2$-EOR demonstration project. Here, because of the high cost of conventional sensors, a single multicomponent geophone was installed in each 70 m hole. While DAS cables for deep wells may require expensive protection, for shallow near-surface applications much less protection is required and may cost an order of magnitude less. With such cost-effective DAS sensing, the entire hole can be instrumented from the surface with sensors every few meters at a small fraction of the cost of a conventional single geophone. Having multiple sensors in each well may lead to higher fold and more repeatable time-lapse images, compared to what is available with conventional sensors. When the entire hole is instrumented, the spacing can be increased between shallow holes, thus making the monitoring systems more cost effective, suggesting the proposed fiber-optic DAS system can have high impact for land seismic acquisition and monitoring.

Geophysical methods must deliver higher accuracy and fidelity to be used for exploration of low-relief structures, reservoir geophysics, and monitoring in challenging arid regions. While improving surface seismic through increasing channel count is the approach taken by most companies, we have chosen a novel approach of utilizing shallow boreholes instrumented with DAS fiber-optic cables as seismic sensors. Cost-effective sensors via DAS cables in shallow holes, allow direct estimation of near surface velocities, thereby eliminating a major source of structural uncertainty when delineating low-relief structures that are important exploration targets. In development and production, such buried systems can deliver new high-fidelity reservoir characterization and enable cost-effective reservoir monitoring leading to increased recovery. This is a change versus land seismic, where instead of putting more channels on the surface with diminishing returns, more significant data quality improvement can be achieved using far fewer and higher quality channels in buried shallow holes.

A two-dimensional field experiment demonstrating the validity of the components and the entire system 100 was conducted as described. Smart DAS boreholes, which enable simpler, safer, and more cost-efficient operation, were found to produce excellent data quality for near surface characterization. With sensors present from ground level to total depth, a single source excitation is required resulting in identical source signature for all receivers providing superior waveform quality compared to conventional boreholes.

The connection of these boreholes with a single fiber cable, as may be case for particular implementations, enabled the efficient acquisition of a targeted reflection survey using a buried vertical array. This may significantly reduce the cost of acquiring land seismic data, by removing the huge burden imposed by the hundreds of thousands of geophones and cables typically used. Buried DAS arrays can provide an alternative approach to imaging smaller prospect areas, and can serve as efficient surrogates for localized seismic surveys. Comparison of the acquired DAS data with legacy seismic revealed good agreement between DAS and geophone data both on pre-stack gathers, amplitude spectra, and final stack.

Figure 17:
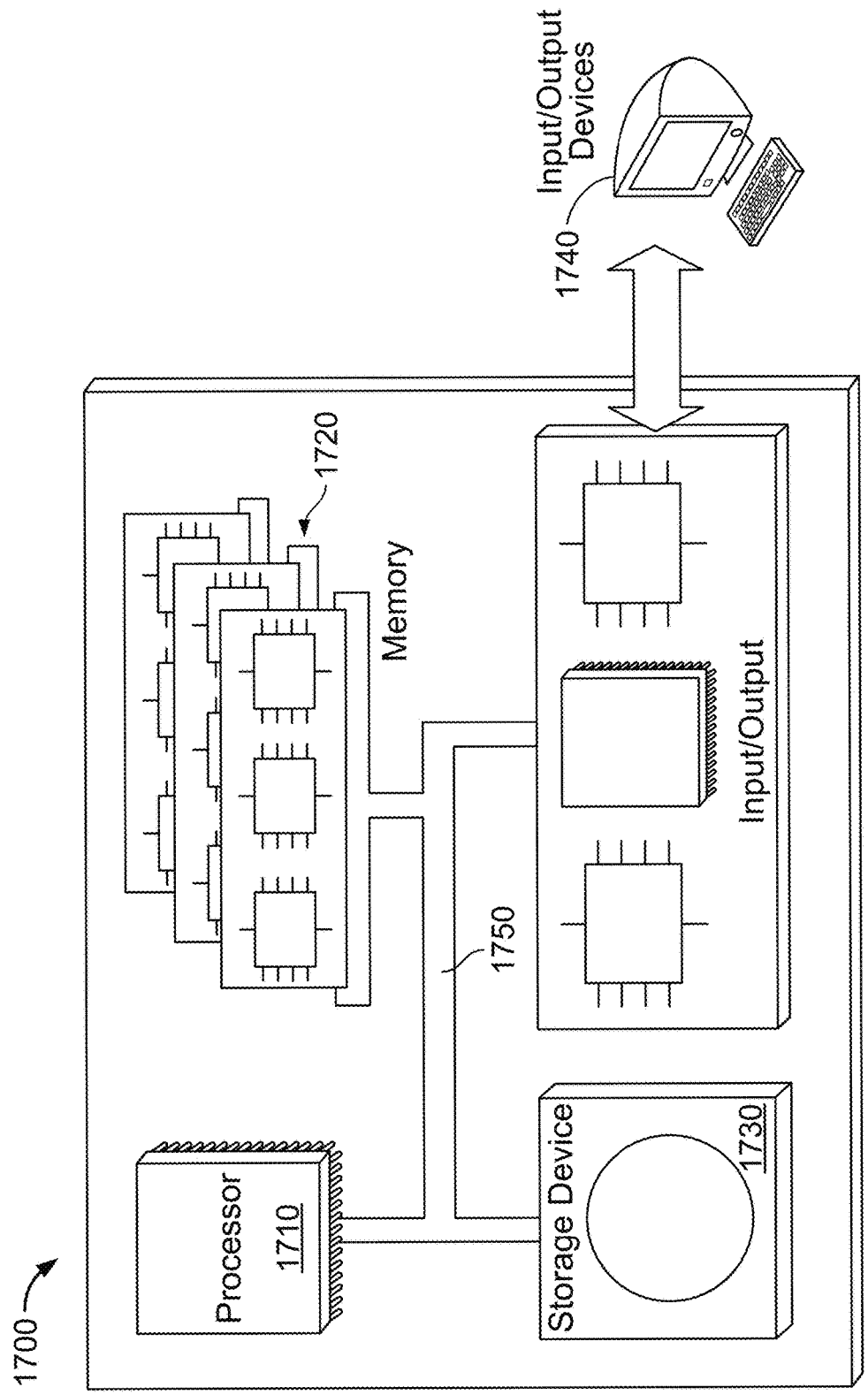
FIG. 17 is a schematic illustration of an example control system a seismic data acquisition and processing system according to the present disclosure.

FIG. 17 is a schematic illustration of an example controller 1700 (or control system) for a seismic data acquisition and processing system (for example, system 100) according to the present disclosure. For example, the controller 1700 may include or be part of the control system 150 shown in FIG. 1C. The controller 1700 is intended to include various forms of digital computers, such as printed circuit boards (PCB), processors, or digital circuitry that is part of a seismic data acquisition and processing system. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1700 includes a processor 1710, a memory 1720, a storage device 1730, and an input/output device 1740. Each of the components 1710, 1720, 1730, and 1740 are interconnected using a system bus 1750. The processor 1710 is capable of processing instructions for execution within the controller 1700. The processor may be designed using any of a number of architectures. For example, the processor 1710 may be a CISC (Complex Instruction Set Computers) processor, a RISC (Reduced Instruction Set Computer) processor, or a MISC (Minimal Instruction Set Computer) processor.

In one implementation, the processor 1710 is a single-threaded processor. In another implementation, the processor 1710 is a multi-threaded processor. The processor 1710 is capable of processing instructions stored in the memory 1720 or on the storage device 1730 to display graphical information for a user interface on the input/output device 1740.

The memory 1720 stores information within the controller 1700. In one implementation, the memory 1720 is a computer-readable medium. In one implementation, the memory 1720 is a volatile memory unit. In another implementation, the memory 1720 is a non-volatile memory unit.

The storage device 1730 is capable of providing mass storage for the controller 1700. In one implementation, the storage device 1730 is a computer-readable medium. In various different implementations, the storage device 1730 may be a floppy disk device, a hard disk device, an optical disk device, or a tape device.

The input/output device 1740 provides input/output operations for the controller 1700. In one implementation, the input/output device 1740 includes a keyboard or pointing device. In another implementation, the input/output device 1740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described may include more steps or fewer steps than those described. Further, the steps in such example operations, methods, or processes may be performed in different successions than that described or illustrated in the figures. Accordingly, other implementations are within the scope of the following claims.

What is claimed is:

1. A geologic survey system comprising:
 a plurality of acoustic sources spaced at intervals over a target area of a terranean surface, each of the plurality of acoustic sources configured to generate a seismic energy wave;
 a plurality of acoustic sensors positioned in a plurality of boreholes formed in a geologic formation, the boreholes having a depth sufficient to reach a geologic datum; and
 a control system communicably coupled to the plurality of acoustic sensors and configured to perform operations comprising:
  receiving, from the plurality of acoustic sensors, data associated with reflected acoustic signals generated by the plurality of acoustic sources and received by the plurality of acoustic sensors;

determining, based on the received data, a subsurface topology of the geologic formation, the determining comprising:
processing, with the control system, the data associated with reflected acoustic signals in a time imaging model by:
estimating static corrections of the data associated with reflected acoustic signals,
partitioning the estimated static corrections into a short-wavelength and a long-wavelength,
attenuating noise from the estimated static corrections of the data associated with reflected acoustic signals,
shifting the estimated static corrections of the data associated with reflected acoustic signals to a plurality of pre-defined intermediate depth levels based on vertical timeshifts measured from the plurality of boreholes,
stacking common gathers from each of the plurality of acoustic sensors to generate a plurality of supergathers, each of the supergathers having an improved signal-to-noise ratio,
at each of the plurality of pre-defined intermediate depth levels:
sorting the plurality of supergathers to a common depth point,
applying the short-wavelength static corrections,
estimating normal moveout velocity and applying a normal moveout correction and stack,
applying the long-wavelength static shifts to the geologic datum,
stacking the plurality of stacks generated from the plurality of pre-defined intermediate depth levels into a final stack, and
performing a post-stack time migration, and
processing, with the control system, the data associated with reflected acoustic signals in a depth imaging model; and
generating a subsurface model of the geologic formation based on the determined subsurface topology.

2. The system of claim 1, wherein the plurality of boreholes are formed at a regular interval corresponding to a desired sample wavelength of the seismic energy wave.

3. The system of claim 1, wherein each acoustic sensor comprises a fiber optic acoustic sensor.

4. The system of claim 3, wherein each fiber optic acoustic sensor comprises a fiber optic turnaround assembly.

5. The system of claim 4, wherein the plurality of fiber optic turnaround assemblies are coupled together with a single fiber optic cable.

6. The system of claim 1, wherein processing the data associated with reflected acoustic signals in the depth imaging model comprises:
performing an up-down separation of the noise attenuated estimated static corrections of the data associated with reflected acoustic signals;
generating a near-surface velocity model between the terranean surface and the geologic datum by interpolating measured velocities of the reflected acoustic signals;
generating a deep velocity model at a depth below the geologic datum; and
pre-stacking depth migration from the terranean surface based on a global velocity model that comprises the near-surface velocity model.

7. The system of claim 1, wherein the plurality of acoustic sources are spaced at regular and repeating intervals over the target area of a terranean surface, the plurality of acoustic sources comprising a source carpet positioned on the terranean surface.

8. The system of claim 1, wherein the regular and repeating intervals are between 100 meters and 1000 meters.

9. The system of claim 1, wherein the geologic formation comprises a complex geologic structure and a low-relief geologic structure.

10. A method comprising:
positioning a plurality of acoustic sensors into a plurality of boreholes;
positioning a plurality of acoustic sources on or near a terranean surface;
emitting, by the plurality of acoustic sources, an acoustic signal directed into a subsurface geologic formation;
receiving, by the plurality of acoustic sensors, a reflected acoustic signal from the subsurface geologic formation;
determining a subsurface topology of the geologic formation based on receiving the reflected acoustic signal by the plurality of acoustic sensors, the determining comprising:
processing, with a control system communicably coupled to the acoustic sensors, the reflected acoustic signal in a time imaging model by:
estimating static corrections of the reflected acoustic signal,
partitioning the estimated static corrections into a short-wavelength and a long-wavelength,
attenuating noise from the estimated static corrections of the reflected acoustic signal,
shifting the estimated static corrections of the reflected acoustic signal to a plurality of pre-defined intermediate depth levels based on vertical timeshifts measured from the plurality of boreholes,
stacking common gathers from each of the plurality of acoustic sensors to generate a plurality of supergathers, each of the supergathers having an improved signal-to-noise ratio,
at each of the plurality of pre-defined intermediate depth levels:
sorting the plurality of supergathers to a common depth point,
applying the short-wavelength of the estimated static corrections, and
estimating normal moveout velocity and applying a normal moveout correction and stack,
applying the long-wavelength static shifts to the geologic datum,
stacking the plurality of stacks generated from the plurality of pre-defined intermediate depth levels into a final stack, and
performing a post-stack time migration, and
processing, with the control system, the reflected acoustic signal in a depth imaging model; and
creating a subsurface model of the geologic formation based on the determined subsurface topology.

11. The method of claim 10, further comprising drilling the plurality of boreholes in a geologic formation, at least a portion of the boreholes having a depth sufficient to reach a geologic datum.

12. The method of claim 10, wherein processing the reflected acoustic signal in the depth imaging model comprises:

performing an up-down separation of the noise attenuated estimated static corrections of the reflected acoustic signal;
generating a near-surface velocity model between the terranean surface and the geologic datum by interpolating measured velocities of the reflected acoustic signals;
generating a deep velocity model at a depth below the geologic datum; and
pre-stacking depth migration from the terranean surface based on a global velocity model that comprises the near-surface velocity model.

13. The method of claim 10, wherein positioning the plurality of acoustic sources on or near the terranean surface comprises positioning the plurality of acoustic sources at regular and repeating intervals over a target area of the terranean surface, the plurality of acoustic sources comprising a source carpet positioned on the terranean surface.

14. The method of claim 13, wherein the regular and repeating intervals are between 100 meters and 1000 meters.

15. The method of claim 10, wherein the plurality of boreholes are formed at a regular interval corresponding to a desired sample wavelength of the seismic energy wave.

16. The method of claim 10, wherein each acoustic sensor comprises a fiber optic turnaround assembly.

17. The method of claim 16, wherein the plurality of fiber optic turnaround assemblies are coupled together with a single fiber optic cable.

18. A computer-implemented method for generating a subsurface model, comprising:
identifying, with a hardware processor, data associated with reflected acoustic signals generated by a plurality of acoustic sources and received by a plurality of acoustic sensors;
determining, with the hardware processor, a subsurface topology of the geologic formation based on the identified data, the determining comprising:
processing, with the hardware processor, the data associated with the reflected acoustic signals in a time imaging model by:
estimating static corrections of the data associated with reflected acoustic signals,
partitioning the estimated static corrections into a short-wavelength and a long-wavelength,
attenuating noise from the estimated static corrections of the data associated with the reflected acoustic signals,
shifting the estimated static corrections of the data associated with the reflected acoustic signals to a plurality of pre-defined intermediate depth levels based on vertical timeshifts measured from a plurality of boreholes,
stacking common gathers from each of the plurality of acoustic sensors to generate a plurality of supergathers, each of the supergathers having an improved signal-to-noise ratio,
at each of the plurality of pre-defined intermediate depth levels:
sorting the plurality of supergathers to a common depth point,
applying the short-wavelength static corrections, and
estimating normal moveout velocity and applying a normal moveout correction and stack,
applying the long-wavelength static shifts to the geologic datum,
stacking the plurality of stacks generated from the plurality of pre-defined intermediate depth levels into a final stack, and
performing a post-stack time migration, and
processing, with the hardware processor, the data associated with the reflected acoustic signals in a depth imaging model; and
generating, with the hardware processors, the subsurface model of the geologic formation based on the determined subsurface topology.

19. The computer-implemented method of claim 18, wherein processing the data associated with reflected acoustic signals in the depth imaging model comprises:
performing an up-down separation of the noise attenuated estimated static corrections of the data associated with reflected acoustic signals;
generating a near-surface velocity model between the terranean surface and the geologic datum by interpolating measured velocities of the reflected acoustic signals;
generating a deep velocity model at a depth below the geologic datum; and
pre-stacking depth migration from the terranean surface based on a global velocity model that comprises the near-surface velocity model.

20. The computer-implemented method of claim 18, wherein the plurality of boreholes are formed at a regular interval corresponding to a desired sample wavelength of the seismic energy wave.

21. The computer-implemented method of claim 18, wherein each acoustic sensor comprises a fiber optic turnaround assembly.

22. The computer-implemented method of claim 21, wherein the plurality of fiber optic turnaround assemblies are coupled together with a single fiber optic cable.

* * * * *